United States Patent [19]

Branigin et al.

[11] 4,360,891
[45] Nov. 23, 1982

[54] ADDRESS AND DATA INTERFACE UNIT

[75] Inventors: Michael H. Branigin, Penllyn; Ladislaw D. Cubranich, Lansdale; Edward E. Henderson, Philadelphia, all of Pa.

[73] Assignee: Sperry Corporation, New York, N.Y.

[21] Appl. No.: 140,267

[22] Filed: Apr. 14, 1980

[51] Int. Cl.³ .............................................. G06F 9/30
[52] U.S. Cl. ................................................... 364/900
[58] Field of Search ... 364/200 MS File, 900 MS File, 364/788, 757, 756

[56] References Cited

U.S. PATENT DOCUMENTS

| | | | |
|---|---|---|---|
| 3,710,348 | 1/1973 | Craft | 364/900 |
| 3,890,496 | 6/1975 | Hartzog | 364/756 |
| 3,909,789 | 9/1975 | Holtey et al. | 364/200 |
| 3,943,495 | 3/1976 | Garlic | 364/200 |
| 3,962,682 | 6/1976 | Bennett | 364/200 |
| 3,978,456 | 8/1976 | Moran | 364/200 |
| 3,979,730 | 9/1976 | Bennett et al. | 364/900 |
| 3,984,670 | 10/1976 | Erickson | 364/200 |
| 4,003,033 | 1/1977 | O'Keefe | 364/200 |
| 4,058,851 | 11/1977 | Scheuneman | 364/200 |
| 4,085,448 | 4/1978 | Kogge | 364/900 |
| 4,125,867 | 11/1978 | Cochran | 364/781 |
| 4,161,784 | 7/1979 | Cushing | 364/200 |
| 4,163,287 | 7/1979 | Munter | 364/757 |
| 4,203,157 | 5/1980 | Daniels et al. | 364/788 |
| 4,254,471 | 3/1981 | Hunt | 364/784 |

OTHER PUBLICATIONS

J. Dirac, "Call Instruction", IBM Tech. Disc. Buletin, vol. 8, No. 12, May 1966, p. 1751.

Electronic Design 21, High-Performance ECL, Oct. 11, 1978, p. 19.
Electronics, Feb. 15, 1979, pp. 125-126.
Electronics Engineering Times, Feb. 18, 1980, pp. 46-47.

Primary Examiner—James D. Thomas
Assistant Examiner—David Y. Eng
Attorney, Agent, or Firm—James R. Bell; Marshall M. Truex

[57] ABSTRACT

A large scale integrated circuit is designed to handle bus-to-bus data and address transfers, manipulation, and temporary storage. A key feature of the device is that it generates error correcting code parity bits on a byte wide basis so that ECC check bits for a multi-byte word can be generated externally with a minimum of hardware, and includes circuitry responsive to an error syndrome for correcting a single error within a byte. Data manipulation capabilities include standard logical operations, single bit shift operations, binary 2's complement arithmetic addition and subtraction, and decimal addition and subtraction. In addition, an input data byte on any bus can be passed unaltered or inverted to any other bus. The device is capable of receiving operands from one or two of three bidirectional data buses, performing a desired arithmetic or logical operation on the operand or operands, and returning the result to any one of the bidirectional buses including one which may have supplied one of the operands. An instruction is decoded at the leading edge of a clock pulse, and executed during the clock pulse. The result is entered into a result register on the trailing edge of the clock pulse so that that result is available to any bus during the same microcycle the instruction and operands are received.

8 Claims, 22 Drawing Figures

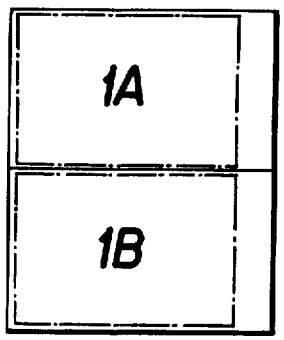
FIG. 1C
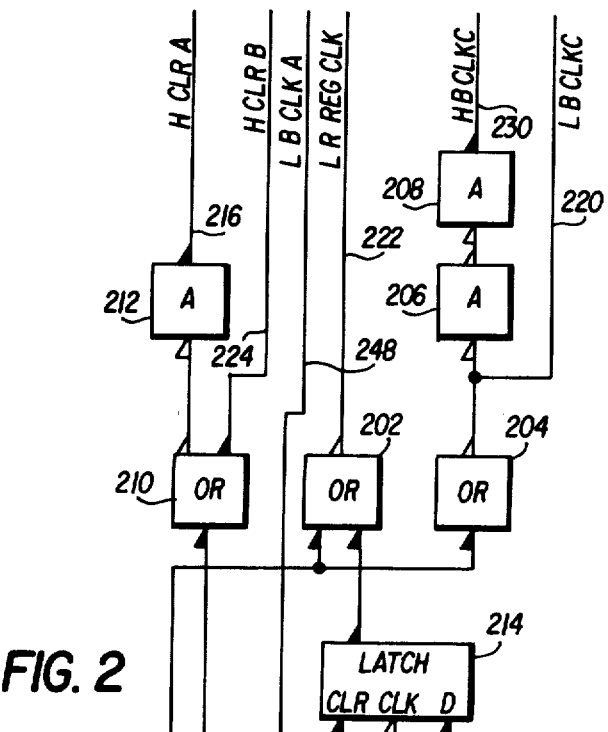
FIG. 2
FIG. 16
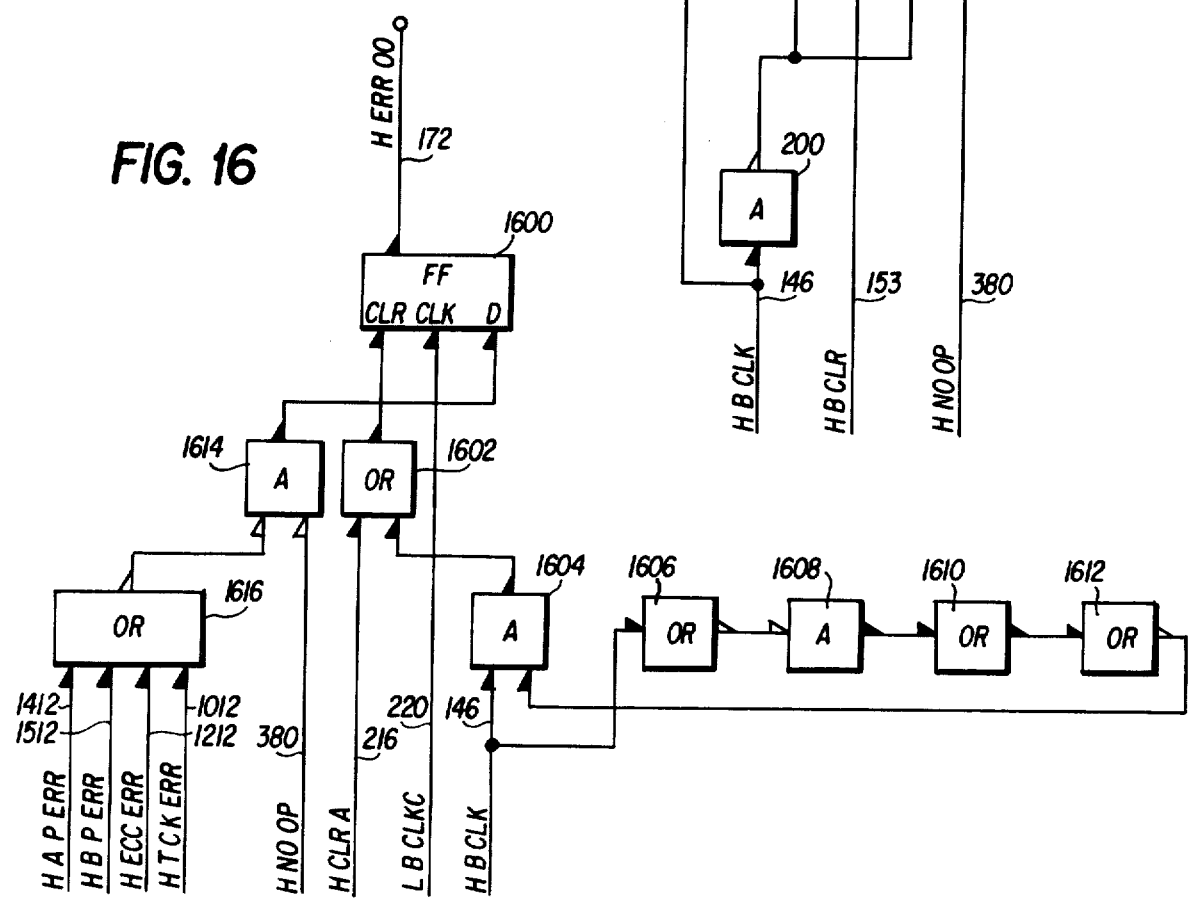

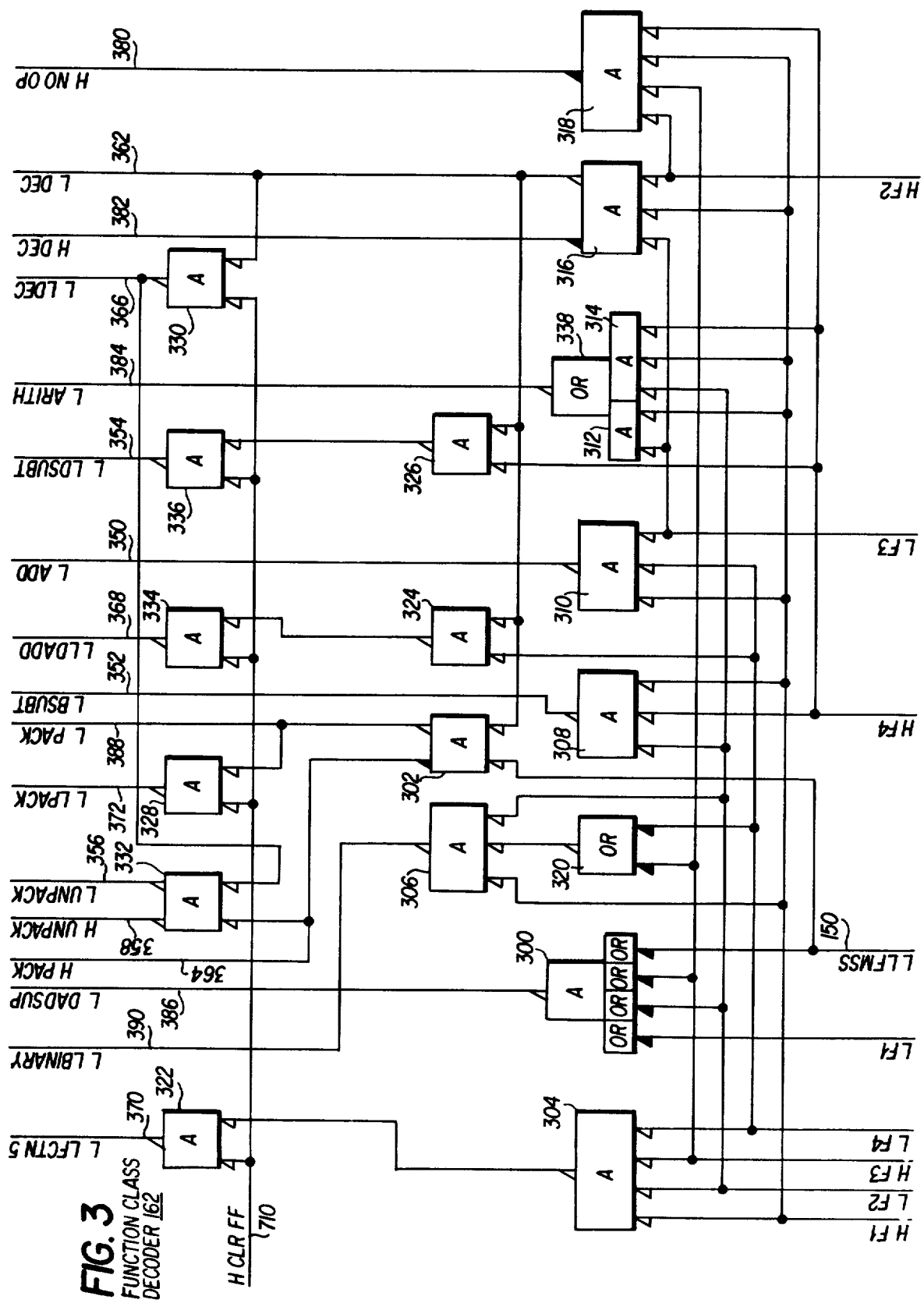
FIG. 3 FUNCTION CLASS DECODER 162

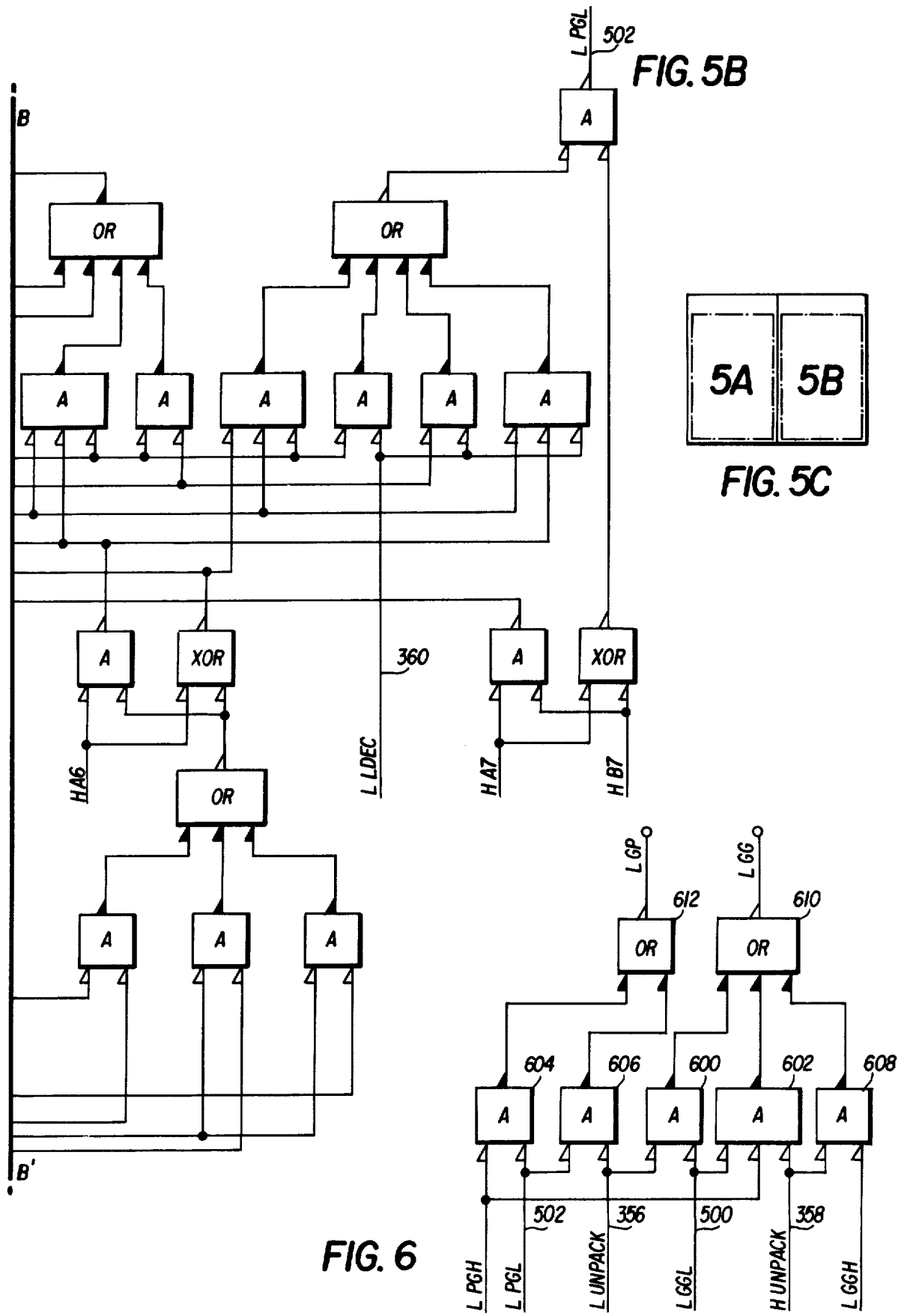

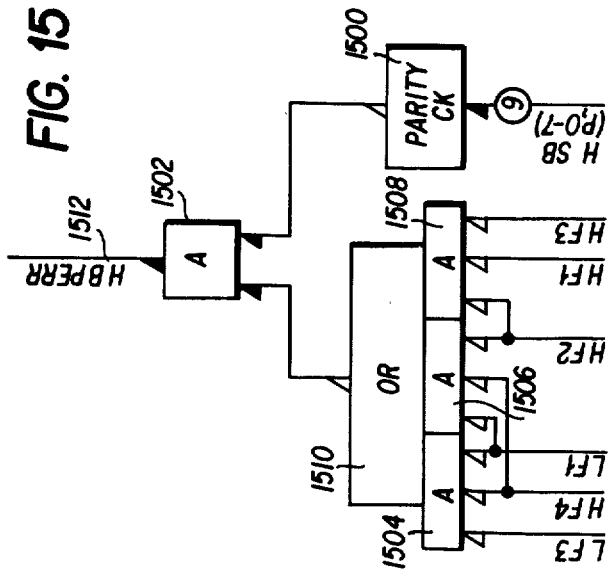
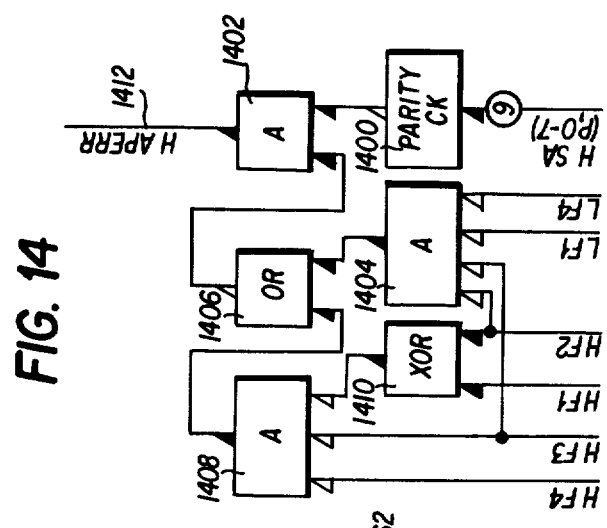
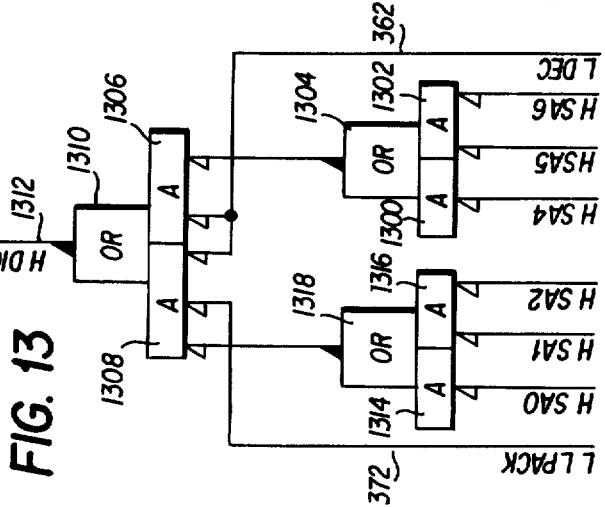
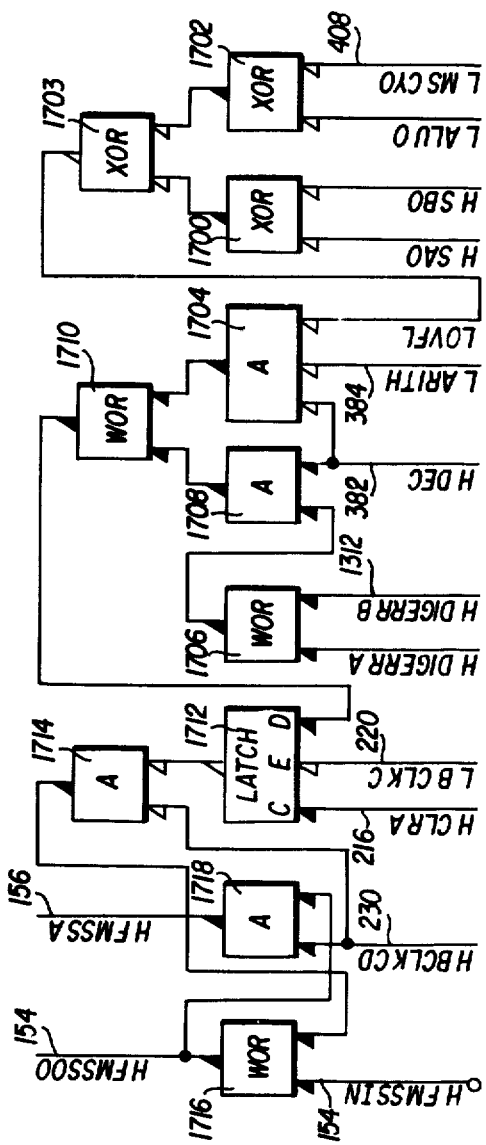

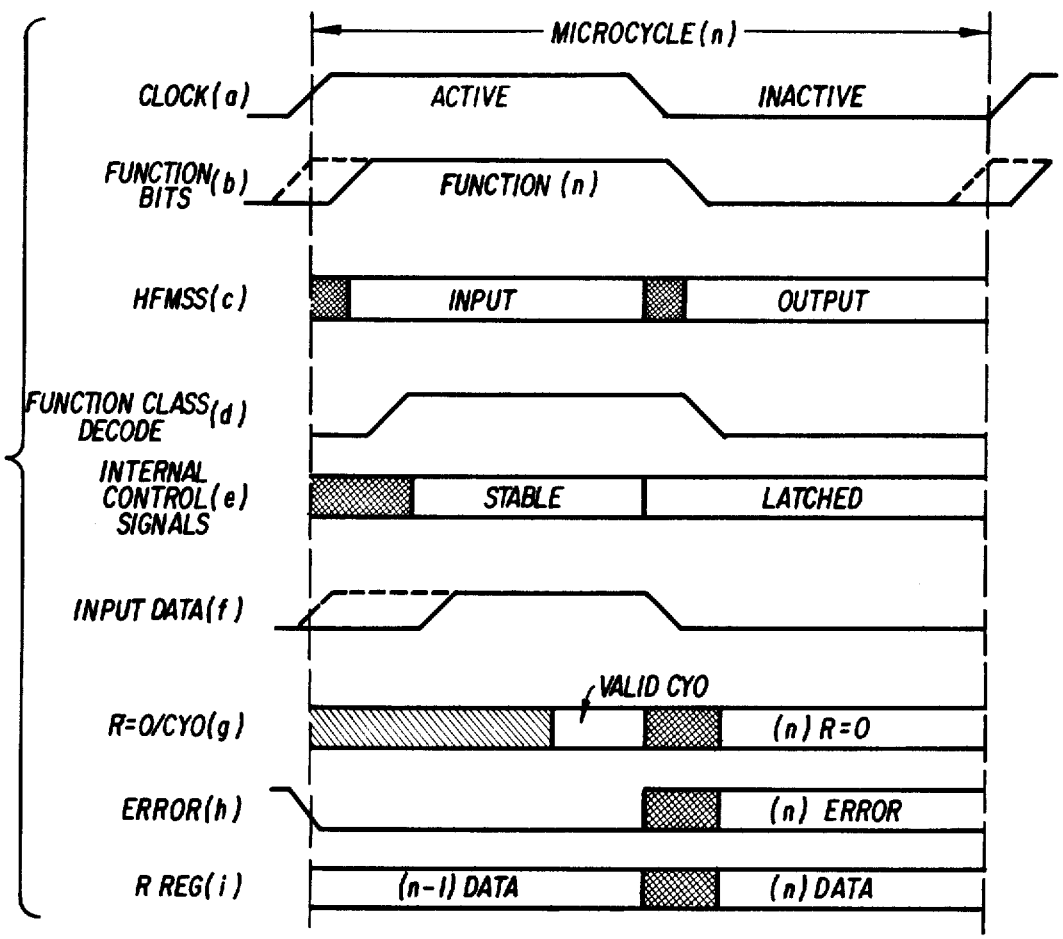

ADDRESS AND DATA INTERFACE UNIT

RELATED APPLICATIONS

This application is related to the concurrently filed application of M. H. Branigin et al. Ser. No. 140,365 entitled Multi-Function Net, the disclosure of which is incorporated herein by reference.

BACKGROUND OF THE INVENTION

The present invention relates to a byte-wide building block which may be connected to three bidirectional buses and serve as a memory interface device or a processor.

Improved fabrication techniques have led to the development of very large scale integrated circuits suitable for use in data processors. Because of the relatively low cost and small size, it has been customary to build modular integrated circuits capable of performing a plurality of functions and being programmable for specific applications. The modules are frequently built as byte wide blocks capable of handling operands of 8-bits plus a parity bit. The modules are usually provided with pin connections for connection to two or more buses which may or may not be bidirectional buses. One module of the prior art is capable of receiving operands on two input buses, performing an arithmetic or logical operation on the operands, and presenting the result to an output bus within one microcycle or one clock pulse interval. However, insofar as is known to applicants, no module of the prior art is capable of receiving an operand from a given bus, performing an arithmetic or logical operation on that operand, and returning the result of the operation to the same bus as well as other buses during the same microcycle.

Error checking and correcting codes are known in the prior art. In a typical code, particular bits of a multi-byte word are exclusively ORed to produce a multibit check byte. The check byte may be stored in the memory along with the word with which it is associated. On read out from the memory a new check byte is generated from the data and compared with the check byte retrieved from the memory. If only a single error has occurred it can be detected and corrected or, if multiple errors have occurred they may be detected.

Because the error correcting code check bits for each byte result from an exclusive OR of different sets of data bits in each of the bytes of a multi-byte word, it has been customary in the past to provide a specialized module for handling the error checking and correction operations. The use of a specialized module detracts from the overall modularity of a system and it is desirable that the error checking and correcting capabilities be provided by modular circuits which may be identical for each byte of a multi-byte word.

BRIEF SUMMARY OF THE INVENTION

An object of the present invention is to provide an integrated circuit chip adapted for connection to external means including an instruction bus on which instructions appear, a source producing a clock pulse, a function modifier control line on which function modifier signals appear, and at least one data bus. The integrated circuit chip includes instruction decoder means for receiving an instruction from the instruction bus, a clock pulse from the source, and a signal on the function modifier control line. The instruction decoder means is responsive to the leading edge of the clock pulse for producing control signals during the clock pulse.

A result register is provided and has an output connected to an arithmetic logic unit (ALU). The ALU has an output connected to the result register and includes means for performing an Exclusive-OR function on signals applied to its inputs.

Error syndrome decoder means are connected between the data bus and the ALU. The instruction decoder means includes first means responsive to a predetermined instruction on the instruction bus and the presence of a signal on the function modifier control line for controlling the error syndrome decoder means to decode an error syndrome on the data bus. The instruction decoder means includes second means responsive to the predetermined instruction on the instruction bus and the presence of a signal on the function modifier control line for controlling the ALU to take the Exclusive-OR of the decoder error syndrome and the output from the result register. The result register is responsive to the trailing edge of the clock pulse for receiving the output of the ALU. The instruction decoder means includes third means responsive to the predetermined instruction and the absence of a signal on the function modifier control line for inhibiting operation of the error syndrome decoder means whereby a zero value output is produced. The instruction decoder means also includes fourth means responsive to the predetermined instruction and the absence of a signal on the function modifier control line for controlling the arithmetic logic unit to perform the Exclusive-OR function on the zero value and the output in the result register.

Other objects of the invention and its mode of operation will become apparent upon consideration of the following description and the accompanying drawings.

BRIEF DESCRIPTION OF THE DRAWINGS

FIG. 2 shows the logic circuits for distributing the primary clock signal and generating the clocking signal for the R Register;

FIG. 3 shows the logic circuits of the function class decoder;

FIGS. 5A and 5B, when arranged as shown in FIG. 5C, and FIG. 6, show the logic of the carry generate and carry propagate circuits of FIG. 4;

FIG. 13 shows a circuit for checking for a valid decimal digit code;

FIG. 14 shows the circuits for controlling the checking of parity of one operand input to the arithmetic logic unit;

FIG. 15 shows the circuits for controlling the checking of parity of the second operand input to the arithmetic logic unit;

FIG. 16 shows the error flip-flop and its input control circuits;

FIG. 17 shows the function modification I/O control circuits;

FIG. 19 shows various waveforms illustrating relative timings within the system;

FIG. 20 illustrates the format of the A Bus input to a selected ADIU during error correction;

FIG. 21 shows the eight possible combination of bits applied to the A Bus of a selected ADIU during error correction, and the corresponding ECC correction decode output for the ADIU; and, FIG. 22 shows the formats of the A Bus input and ECC correction decode output for an unselected ADIU during error correction.

DETAILED DESCRIPTION OF THE INVENTION

Conventions Employed

Figure 1A:
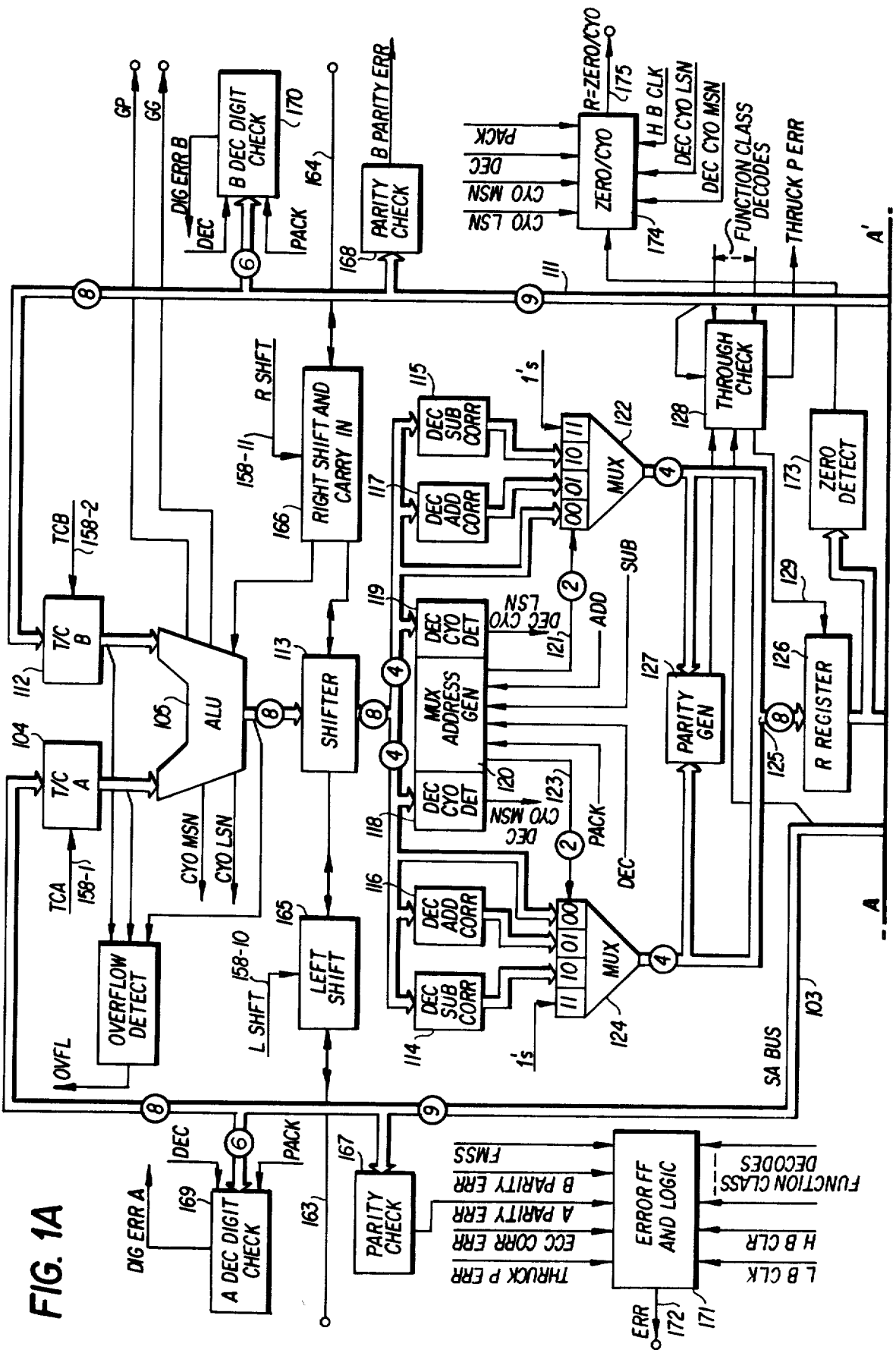
FIGS. 1A and 1B, when arranged as shown in FIG. 1C, comprise a block diagram of an address and data interface unit constructed in accordance with the principles of the present invention.

In the drawings the same reference numeral is utilized throughout the drawings to represent a given element. The first digit of a three digit reference numeral and the first two digits of a four digit reference numeral provides an indication of the figure where the element is located. Input leads to the figures are assigned reference numerals such that the first digit or first two digits indicate the figure where the lead originates. The only exceptions to this convention are the leads having reference numerals between 100 and 199. These leads are shown in FIG. 1 but may connect through pin connections to circuits external of the disclosed system. Pin connections are designated by small circles at the end of a lead or bus.

Input and output leads from the figures are assigned names preceded by an L or an H indicating the voltage level on the lead when the condition specified by the signal name is true. For example, H B CLK indicates that the voltage level on a particular lead is high when the B clock is true or at the logic 1 level.

OVERVIEW—FIGS. 1A AND 1B

Figure 1B:
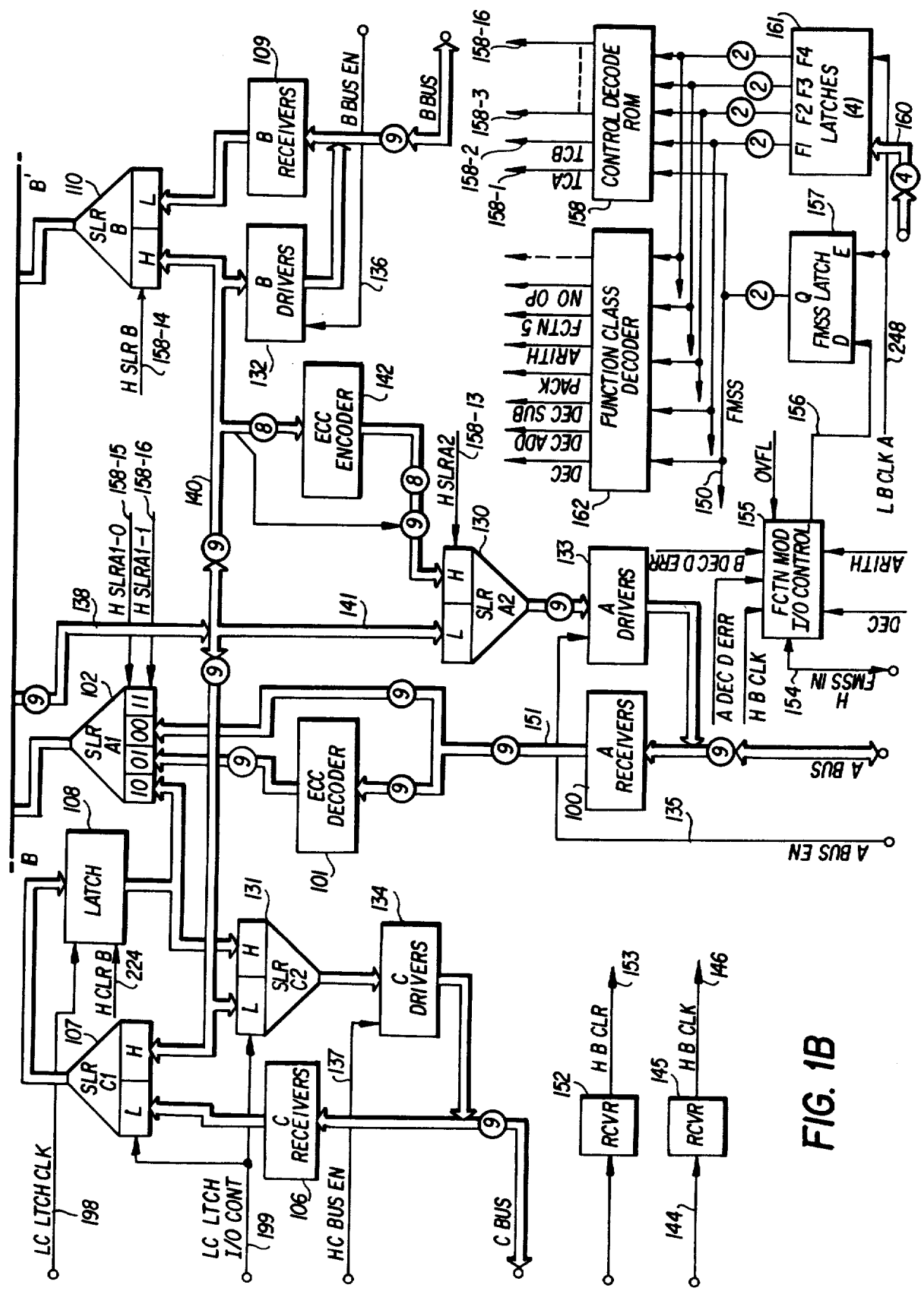

FIGS. 1A and 1B, when arranged as shown in FIG. 1C, comprise a block diagram of an address and data interface unit (ADIU) constructed in accordance with the principles of the present invention. The ADIU is a byte wide building block or chip adapted for connection to three bidirectional data buses designated the A Bus, B Bus and C Bus. The A, B and C Buses are 9-bit buses for handling bytes comprising 8 bits plus parity. Bit 0 is the most significant bit.

The A Bus is connected to a set of A receivers 100 and the A receivers have their outputs connected in parallel to an error correction code (ECC) decoder 101 and one set of inputs of a selector 102. A Bus 103 connects the outputs from selector 102 to one input of the arithmetic and logic unit (ALU) and more specifically to the true/complement circuit 104 which feeds the ALU 105. Selector 102 receives the signals H SLRAI-0 and H SLRAI-1 from a control decode ROM 158. If these signal are both false then the contents of the A Bus is applied to the ALU. If H SLRAI-0 is false and H SLRAI-1 is true then the output of the ECC Decoder is gated through the selector to the ALU.

A byte of data on the C Bus may also be fed to the ALU 105 over the BUS 103. The C Bus is connected through a set of C receivers 106 to one set of inputs of a selector 107 and the outputs from the selector are connected to a latch 108. The outputs from latch 108 are connected to a set of inputs of selector 102. Selector 107 receives the signal L C LTCH I/O CONT and is enabled to receive the output of C receivers 106 when the signal is true. The output of selector 107 is clocked into the latch 108 when the signal L C LTCH CLK goes true. The contents of the latch 108 are gated through selector 102 to the SA Bus 103 when the signal H SLRAI-0 is true and the signal H SLRAI-1 is false. Latch 108 is cleared by the signal H CLR B on lead 224. The latch 108 permits the storage of asynchronous external data for use by the ADIU, or the storage of data from a result or R Register 126 as subsequently explained.

A second byte of data may be fed to the ALU 105 from the B Bus. This bus is connected through a set of B receivers 109 to one set of inputs of a selector SLR B 110. The outputs from selector 110 are applied over an SB Bus 111 and through a true/complement B circuit 112 to the B inputs of ALU 105.

One or two operands applied to ALU 105 may be operated on by the ALU and the result returned to the A, B, and/or C Bus regardless of which bus or buses supplied the operands. The ALU treats each operand as two 4-bit binary numbers (nibbles). As subsequently explained, each operand may, in fact, represent an 8-bit binary number, two 4-bit binary coded decimal digits packed into a single byte, or a single binary coded decimal digit which is unpacked. The resulting output from the ALU is 8 binary bits which must be corrected if they in fact represent one or more decimal digits. The output of ALU 105 is passed through a shifter 113 and applied to Decimal Subtraction Correction Circuits 114 and 115, Decimal Addition Correction Circuits 116 and 117 and Decimal Carry Out Detector Circuits 118 and 119.

The manner in which the output of the ALU is treated is determined by the control signals PACK, DECIMAL, ADD and SUBTRACT produced by a Function Class Decoder 162 in response to an input instruction. These signals are applied to a Multiplexer Address Generator 120 which generates four multiplexer address bits. Two of these bits are applied over leads 121 to a 4:1 Multiplexer 122 and the other two bits are applied over leads 123 to a 4:1 Multiplexer 124.

The four high order output bits from the ALU, after passing through Shifter 113, are applied to one set of inputs of MUX 124 while the four low order bits are applied to the corresponding set of inputs of MUX 122. The outputs from Decimal Addition Correction Circuits 116 and 117 are applied to corresponding second sets of inputs of MUXs 124 and 122 while the outputs of Decimal Subtraction Correction Circuits 114 and 115 are applied to corresponding third sets of inputs of the two multiplexers. The fourth sets of inputs of the multiplexers are tied to a logic 1 voltage.

The selected inputs to MUXs 122 and 124 are passed through the multiplexers and over a Bus 125 to an R Register 126. A Parity Generator 127 generates a parity bit from the data bit outputs of MUXs 122 and 124 and, by means of a Through Check Circuit 128 (subsequently described) applies a parity bit to the R Register over a lead 129.

The result contained in the R Register may be returned to the A, B or C Bus or all of them. Thus, the output of the R Register is connected to one set of inputs of the A Bus Output Selector 130, one set of inputs of the C Bus Output Selector 131, and the B Bus Drivers 132. The B Bus Drivers are connected to the B Bus, while the outputs from selector 130 are connected through a set of A Drivers 133 to drive the A Bus, and the outputs of selector 131 are connected through a set of C Bus Drivers 134 to drive the C Bus. The selector 130 is enabled to pass the contents of the R Register to the A Bus Drivers 133 when a signal H SLRA2 derived from Control Decoder ROM 158, is false. The selector 131 is enabled to pass the contents of the R Register to the C Bus Drivers 134 when the signal L C LTCH I/O CONT is true.

In order for the output of the R Register to reach the desired bus, the drivers for that bus must be enabled. The enabling signals are derived from circuits external of the chip and applied over leads 135, 136 and 137 to enable the A, B and/or C Drivers 133, 132 and 134, respectively. The receivers always sense the state of a bus hence any time that the drivers for a particular bus are not enabled, then the receivers for that bus may sense a value applied to the chip over the bus.

The output of the R Register is connected by way of Buses 138 and 139 to one set of inputs of selector 107. When the signal L C LTCH I/O CONT is false, the contents of the R Register are gated through selector 107 and gated into Latch 108 by the signal L C LTCH CLK. The signals C LTCH I/O CONT and C LTCH CLK are both derived from circuits external of the chip. Once the contents of the R Register have been gated into Latch 108, they may be subsequently read out on the same or a subsequent microcycle to the C Bus through selector 131 or back into the ALU through selector 102 on a subsequent microcycle.

The output of the R Register is also connected by way of Buses 138 and 140 to selector 110 so that the contents of the R Register may be fed back into the B inputs of the ALU on a subsequent microcycle.

The output of the R Register is also connected by way of Buses 138 and 140 to an ECC Encoder circuit 142, the purpose of which is subsequently explained. The bits on Bus 140 except the parity bit are applied to the circuit 142. The output of the circuit 142 is then fed with the parity bit from Bus 140 to one set of inputs of selector 130 so that the result may be fed through the A Bus Drivers 133 to the A Bus when the signal H SLRA2 is true.

As previously mentioned, the ADIU may be utilized as a byte wide building block in a system handling plural bytes in parallel. The AdIU chip is provided with two bidirectional leads 163 and 164 for transferring shifted bits to or from the adjacent ADIU's. On left shifts a signal from the high order of the Shifter 113 is passed through a Left Shift Control Circuit 165 to the lead 163 while a signal on the lead 164 is passed through the Right Shift Control Circuit 166 to the Shifter 113. On right shifts, a binary bit on lead 163 is passed through Left Shift Control Circuit 165 to the high order of the Shifter 113 while the bit in the low order of the shifter is passed through the Right Shift Control Circuit 166 to the lead 164.

The ADIU includes extensive checking facilities. Bytes of data on SA Bus 103 are parity checked by a Parity Checker 167. In like manner, bytes of data on the SB Bus 111 are parity checked by a Parity Checker 168. Two decimal digits checkers 169 and 170 are provided for checking bytes of data on Buses 103 and 111 to insure that the bits represent valid decimal digits when the ADIU is executing decimal commands. Upon occurrence of an error one or more of the various check circuits produces an error signal and all of these signals are applied to an Error Flip-Flop and Logic Circuit 171. Depending upon the type of error and the function being performed, an error flip-flop within circuit 171 may be set to provide an error output signal from the ADIU on a lead 172.

A Zero Detect Circuit 173 is provided for detecting a zero value in R Register 126. When a zero is detected the circuit 173 produces an output signal to a Zero/CYO circuit 174. The Zero/CYO circuit produces a signal R=ZERO/CYO on a lead 175 for application to circuits external of the ADIU as subsequently explained.

COMMAND AND CONTROL SIGNAL GENERATION

The ADIU is controlled by a 25 nanosecond clock pulse designated the B Clock, there being one clock pulse in a microcycle as illustrated in FIG. 19. The clock signal is applied to the ADIU over a lead 144 and through a receiver 145. The output of receiver 145 is high when the B clock is true and the signal is applied to the circuits of FIG. 2 for distribution throughout the ADIU.

The function to be executed by the ADIU during a given microcycle is completely defined by four function bits and the state of a multiplexed control line called the Function Modifier and Special Status line (FMSS). The active state of the B Clock defines the FMSS control line as an input and the inactive state of the B clock defines it as an output. For those commands sensitive to the state of the FMSS control line, its state is sensed while the clock is active. Soon after the clock goes inactive, the ADIU can activate the FMSS line to indicate special status conditions for some of the commands. The leading edge of the B Clock is used by the ADIU control logic to remove any active special status conditions from the FMSS control line. After the status has been removed from the FMSS control line, the next command is decoded and executed. The B Clock pulse must be active for a period of time sufficient to decode and execute a given command, i.e. 25 nanoseconds.

In FIG. 1B, the control line 154 carries the signal H FMSS IN and is connected to a Function Modifier and I/O Control Circuit 155 having an output lead 156 which is active if H FMSS IN and B CLK are concurrently active. The active signal on lead 156 sets a Latch 157 to the level of the signal on lead 156 beginning at the leading edge of B CLK and when B CLK goes false the level of the signal on lead 156 is latched in the latch. The output of Latch 157 is the signal FMSS which is distributed to various circuits in the ADIU including a Control Decode ROM 158 and a Function Class Decoder 162.

The four function bits which, with the signal FMSS define the instruction or function to be performed, are applied to the ADIU over a Function Bus 160 and are clocked into a set of four latches 161 at the leading edge of B CLK. Output from Latches 161 are designated F1–F4, corresponding to the bit positions on Function Bus 160, with F1 being the high order bit. The outputs from Latches 161 are applied to the Control Decode ROM 158 and the Function Class Decoder 162. The Control Decode ROM 158 and the Function Class Decode Circuit 162 produce various gating and control signals which are distributed throughout the ADIU to control the execution of the particular function specified by the four function control bits on Bus 160 and the signal FMSS IN.

FIG. 2 shows the circuits for distributing the B Clock and B Clear signals to the system. The signal H B CLK from Receiver 145 is applied over lead 146 to an Inverter 200 and passed through the inverter to produce the signal L B CLKA. The signal H B CLK is also applied to an OR 202 to produce the signal L R REG CLK and to an OR 204 to produce the signal L B CLK C. The output of OR 204 passes through two ANDs 206 and becomes the signal H B CLK C on lead 230.

The signal H B CLR, derived from Receiver 152 of FIG. 1, is applied to an OR 210 having one output designated H CLR B. The other output of OR 210 is passed through an AND 212 to generate the signal H CLR A.

Also shown in FIG. 2 is the NO OP Latch-type Flip-Flop 214 which is utilized to prevent clearing of the R Register 126 during a NO OPERATION command. The latch is set to the porous state when the output L B CLK A of inverter 200 goes true (low) and is latched by the trailing edge of L B CLK A. The flip-flop is set by the signal NO OP on lead 380. The output of Flip-Flop 214 is connected to an input of OR 202, and when the flip-flop is set the output of OR 202 remains at a low level thus preventing the clocking of data into the R Register. The R Register is normally clocked at the trailing edge of B CLK when the clock signal on lead 146 drives the output of OR 202 false.

FIG. 3 shows the logic circuits included within the Function Class Decoder 162. As previously indicated, commands for controlling the ADIU are generated in response to a 4-bit instruction applied over lead 160 and the control signal FMSS IN applied to the ADIU over the lead 154, with the signals being stored in the Latch 157 and the Latches 161. The outputs from Latch 157 and Latches 161 are applied to the circuits of FIG. 3 to generate various function control commands.

The signal L LFMSS is derived from the FMSS Latch 157 and is applied to one input of an OR-AND Inverter 300 and an AND 302. The signal H F1 is applied to one input of ANDs 304, 306, 308, 310, 312, 314, 316 and 318. The signal L F1 is applied to one input of OR-AND Inverter 300. The signal HF2 is applied to one input of ANDs 316 and 318. The signal L F2 is applied to one input of ANDs 304, 306, 308 and 314 and an input of OR-AND inverter 300. The signal L F3 is applied to one input of ANDs 310, 312 and 316 while the signal H F3 is applied to ANDs 304 and 318 and to one input of an OR 320 and one input of OR-AND Inverter 300.

The output from AND 304 is applied to one input of AND 322 which is further enabled when the signal H CLR FF on lead 710 is false. The output of AND 322 is the signal L LFCTN5.

The output of AND 300 is the command L DADSUP. This signal is true if the signals LFMSS, LF2 and LF1 are false and HF3 is true.

The output of OR 320 is connected to AND 306 which produces the signal L L Binary when the instruction bits F1–F4 have one of the hexadecimal values 4, 6 or 7.

AND 316 has complementary outputs. One output is the command H DEC. The other output is the command L DEC and it is applied to one input of ANDs 302, 324 and 326. AND 302 also has complementary outputs designated H PACK and L PACK. L PACK is applied to AND 328 which is further enabled when the signal H CLR FF is false to produce the signal L LPACK.

The signal L DEC produced by AND 316 is applied to one input of AND 330 which is also enabled when H CLR FF is false. The output of AND 330 is the command L LDEC and this command is applied to an AND 332. AND 332 is further enabled by the signal H PACK from AND 302 and produces the complementary commands H UNPACK and L UNPACK.

The output of AND 324 is connected to one input of AND 334 while the output of AND 326 is connected to one input of AND 336. ANDs 334 and 336 are further enabled when H CLR FF is false and produce the signals L LDADD and L LDSUBT, respectively.

ANDs 312 and 314 feed an OR 338 which produces the command L ARITH.

AND 318 detects when all of the Latches F0–F3 contain binary zeros, and produces the command H NO OP.

As illustrated in FIG. 1B, the output of Latches 161 also addresses the Control Decode ROM 158. The Control Decode 158 is a read-only memory (ROM) which is addressed by the outputs from Function Latches 161 and the FMSS Latch 157. Each time the ROM is addressed it produces a 16-bit output as specifically set forth in Tables I(a) and II(b) to control various functions within the system.

TABLE Ia

| FUNCTION | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| S3 |  |  |  |  |  |  |  |  | H | H | H | H | H | H | H |  |
| S2 | H | H | H | H | H | H | H | H | H |  | H |  |  | H | H | H |
| S1 | H | H | H | H | H | H | H | H | H | H | H | H | H | H | H | H |
| S0 | H | H |  |  |  |  |  |  | H |  | H | H |  |  | H |  |
| M | H | H |  |  |  | H |  |  | H | H | H | H | H | H | H | H |
| SLRA1-0 | H | H |  |  |  |  |  |  |  |  |  |  |  |  | H |  |
| SLRA1-1 | H |  |  |  |  | H |  |  |  |  |  |  |  |  |  |  |
| SLR B |  |  |  |  |  | H |  |  |  |  |  |  |  |  |  |  |
| SLR A2 |  | H |  |  |  |  |  |  |  |  |  |  |  |  |  |  |
| L SH | H | H | H | H | H | H | H | H | H | H | H | H | H | H | H | H |
| NS |  |  |  |  |  |  |  |  | H | H |  |  |  |  |  |  |
| RSH | H | H | H | H | H | H | H | H |  |  | H | H | H | H | H | H |
| TCA |  |  |  |  | H |  |  | H |  |  |  | H | H | H | H |  |
| TCB |  |  | H |  |  | H |  |  |  |  |  | H | H | H |  |  |
| A THRU CK |  | H |  |  |  |  |  |  |  |  |  | H |  |  | H |  |
| B THRU CK |  |  |  |  |  |  |  |  |  |  |  |  |  | H |  |  |
|  |  |  |  |  |  | FMSS = 1 |  |  |  |  |  |  |  |  |  |  |

TABLE I(b)

| FUNCTION | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| S3 | H | H | | | | | | | H | H | H | H | H | H | H | H |
| S2 | H | H | H | H | H | H | H | H | H | | H | | | H | H | H |
| S1 | H | H | H | H | H | H | H | H | H | H | H | H | H | H | H | H |
| S0 | H | H | | | | | | | H | | H | H | | | H | |
| M  | H | H | | | | H | | | H | H | H | H | H | H | H | H |
| SLRA1-0 | H | H | | | | | | | | | | | | | H | |
| SLRA1-1 | H | | | | H | | | | | | | | | | | |
| SLR B | | | | | H | | | | | | | | | | | |
| SLR A2 | | H | | | | | | | | | | | | | | |
| LSH | H | H | H | H | H | H | H | H | | | H | H | H | H | H | H |
| NS  | | | | | | | | | H | H | | | | | | |
| RSH | H | H | H | H | H | H | H | H | H | H | H | H | H | H | H | H |
| TCA | | | | H | | | | | | | | | | | | |
| TCB | | H | | | H | | | | | | | | | | | |
| A THRU CK | | H | | | | | | | | H | | | | H | | |
| B THRU CK | | | | | | | | | | | | | H | | | |

FMSS = 0

ARITHMETIC LOGIC UNIT

Figure 4:
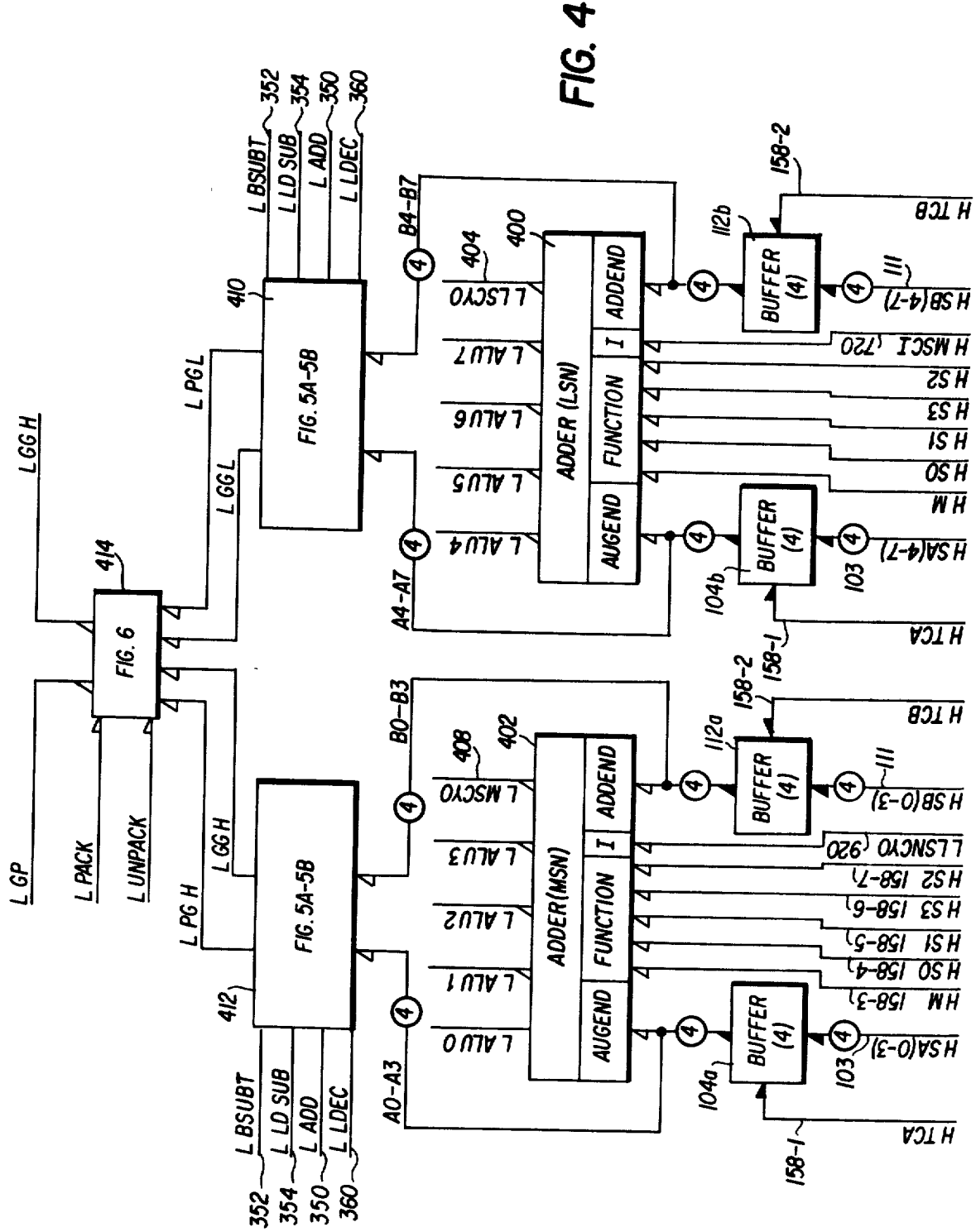
FIG. 4 illustrates the logical organization of the adder, carry generate and carry propagate circuits.

The logical organization of the ALU 105 is illustrated in FIG. 4. The ALU is organized as two 4-bit nibble adders and includes Adders 400 and 402. Functionally, these adders function in the same manner as the adder marketed by Motorola, Inc. having the designation 10181. Adder 400 receives the four least significant bits (least significant nibble) of each operand and Adder 402 receives the four most significant bits (most significant nibble) of each operand. The four high order bits on SA Bus 103 are applied through Buffers 104a to the augend input of Adder 402 while the four low order bits are applied through Buffer 104b to the augend inputs of Adder 400. In like manner, the high order bits on SB Bus 111 are applied through Buffer 112a to the addend inputs of Adder 402 while the four low order bits are applied through Buffer 112b to the addend inputs of Adder 400. It will be recognized that the Buffers 104a and 104b correspond to the True/Complement Circuits 104 of FIG. 1A while the Buffers 112a and 112b correspond to the True/Complement Circuit 112. The signal H TCA is applied to Buffers 104a and 104b to invert the input to the adder from the SA Bus 103 when desired while the signal H TCB is applied to Buffers 112a and 112b to invert the inputs to the adders from the SB Bus 111. The signals H TCA and H TCB are derived from the Control Decode ROM 158.

Each of the nibble adders 400 and 402 has five function control inputs designated M, S0, S1, S2 and S3. These input signals are derived from the Control Decode ROM 158 and determine which arithmetic or logic operation is performed on the operands applied to the adders.

Figure 7:
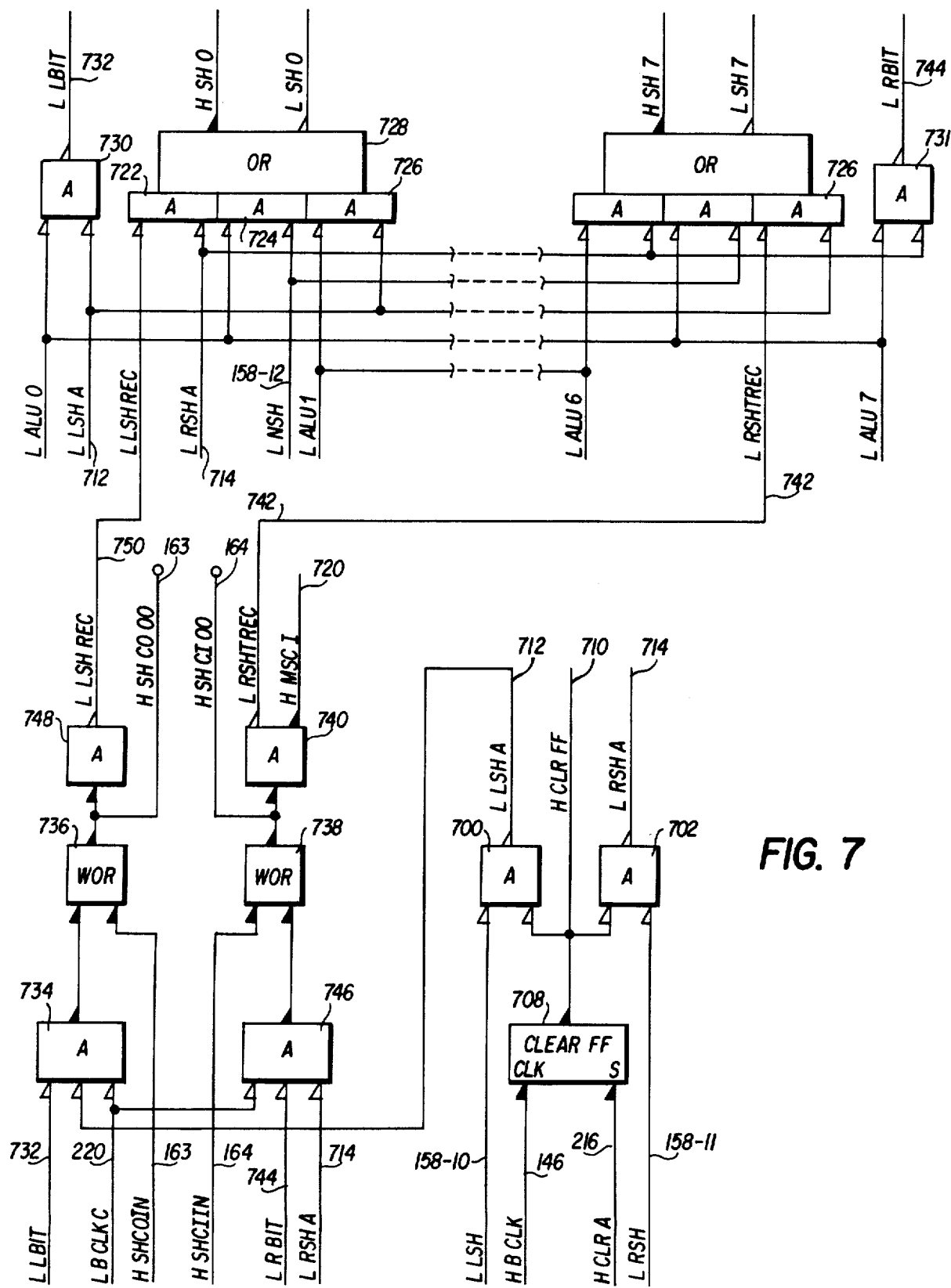
FIG. 7 illustrates the logic of the shifter and right and left shift controls.

Adder 400 has a carry input designated H MSCI which is derived from the right shift and carry control circuits of FIG. 7. Adder 400 produces the carry output signal L LSCYO which is applied to FIG. 9 to generate the signal L LSNCYO. This latter signal is applied over lead 920 to the carry input of Adder 402. Adder 402 has a carry output designated L MSCYO and it is applied to the decimal carry out detection circuit of FIG. 9.

The ALU of FIG. 4 is provided with two Group Propagate and Group Generate Matrices 410 and 412. The matrices are defined for groups of four bits. These four bits can be either the most significant or least significant nibble (digit for decimal operations).

Figure 5A:
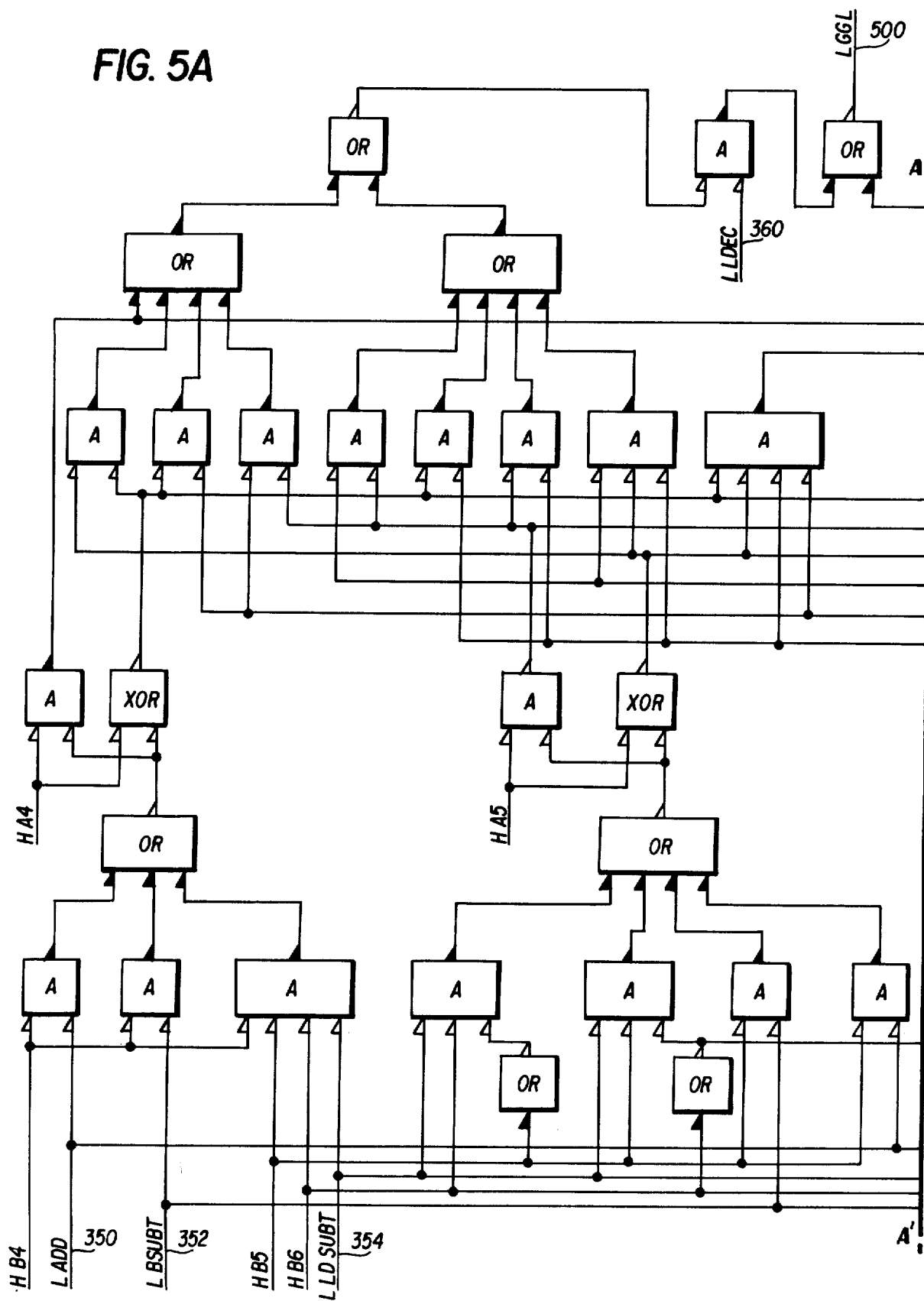

FIGS. 5A and 5B show the details of the Group Propagate and Group Generate Matrix 410. This matrix receives the signals H A4 through H A7 from the True/Complement Buffers 104b and the signals H B4 through H B7 from the True/Complement Buffers 112b. In addition, since the matrix must perform differently for the different arithmetic and decimal operations, it is controlled by the signals L Add on lead 350, L BSUBT on lead 352, L LDSUBT on lead 354 and L LDEC on lead 360. The matrix produces the signal L GGL representing the group generate for the least significant nibble on lead 500 and the signal L PGL representing the group propagate for the least significant nibble on lead 502.

The Matrix 412 handling the four high order bits of a byte is identical to the matrix shown in FIGS. 5A and 5B except that it receives as its data input signals the signals A0–A3 from the True/Complement Buffers 104a and the signals B0–B3 from the True/Complement Buffers 104b.

The various connections between logic elements of the matrix shown in FIGS. 5A and 5B will not be recited in detail as they are evident from the drawing. The outputs from matrices 410 and 412 are applied to a further matrix 414 to define the byte-wide propagate and generate signals. The matrix 414 is shown in detail in FIG. 6. The signal L GGL from the least significant nibble is applied to ANDs 600 and 602. The propagate signal from the least significant nibble is applied to ANDs 604 and 606. The propagate signal L PGH from the most significant nibble is applied to ANDs 602 and 604 while the group generate signal L GGH from the most significant nibble is applied to AND 608. The outputs of ANDs 600, 602 and 608 are connected to OR 610 which produces the chip output signal L GG representing the group generate for the byte. The outputs of ANDs 604 and 606 are applied to OR 612 which produces the chip output signal L GP representing the group propagate signal for the byte.

SHIFTER AND SHIFT CONTROLS

FIG. 7 shows the shift in and shift out circuits, the Shifter 113, and the circuits for generating the right and left shift control signals. The signals L LSH and L RSH are generated by the Control Decode ROM 158. The signal L LSH is applied to AND 700 while the signal L RSH is applied to AND 702. Both of these ANDs are controlled by the output of the Clear Flip-Flop 708. The clear flip-flop is set by the signal H CLRA and is clocked by the signal H B CLK derived from Receiver 145. When the flip-flop is set it produces the signal H CLR FF on lead 710.

As long as flip-flop 708 is not set, it enables ANDs 700 and 702 so that upon occurrence of the signal L LSH, AND 700 produces the signal L LSH A. In like manner, upon occurrence of the signal L RSH AND 702 produces the signal L RSH A.

The signals L LSHA and L RSHA are applied to the shifter shown in FIG. 7 and control left and right shifting, respectively. The shifter comprises eight stages each having three ANDs feeding an OR having complementary outputs. For example, stage 0 includes ANDs 722, 724 and 726 feeding an OR 728 which produces the complementary output signals H SH 0 and L SH 0. The shifter also includes two ANDs 730 and 731.

The ANDs 722 and the AND 731 are active only for right shifting operations. Thus, these ANDs receive the signal L RSHA on lead 714. The ANDs 724 are active only when data is being passed from the ALU, or more specifically from Adders 400 and 402 without a shift in either direction. Thus, all of the ANDs 724 have as one input the signal L NSH which is derived from the Control Decode ROM 158. The ANDs 726 and the AND 730 are active only during left shifting operations hence each of these ANDs receives as one input the signal L LSHA.

The output positions from the Adders 400 and 402 are connected to the ANDs 724 of the corresponding positions of the shifter. In addition, each bit output from the Adders is connected to the AND 722 of the next higher order stage of the shifter and the AND 726 of the next lower order of the shifter, stage 0 being the high order. In addition, the high order bit output ALU 0 from Adder 402 is connected to AND 730 while the low order bit output ALU7 from Adder 400 is connected to AND 731.

From FIG. 7 it is evident that if the signal L NSH is active then the signal ALU0 will pass through AND 724 to drive the signals H SH0 and L SH0 true. On the other hand, if a right shift operation is taking place the signal L RSHA is active hence the signal ALU0 will pass through the AND 722 of stage 1 to generate the signals H SH1 and L SH1. Finally, if a left shifting operation is taking place the signal ALU0 is shifted out to the low order stage of the next ADIU. In this case the signal L LSHA is active and the signal ALU0 passes through AND 730 to become the signal L LBIT on lead 732. This lead is connected to one input of AND 734. AND 734 further receives the left shift signal L LSHA and the clocking signal L B CLKC. Thus, during a left shift if the output of the high order stage ALU0 is a 1 the signal passes through AND 730 and the driver AND gate 734 from whence it passes through wired OR 736 to become the signal H SHCOOO on lead 163. This signal may pass from the ADIU over the lead 163 to the right shift control circuits of the next higher order ADIU. At the same time, the next lower order ADIU may produce the signal H SHCIIN on lead 164 and if this signal is true it passes through wired OR 738 and an AND 740 to generate the signals H MSCI and L RSHTREC on leads 720 and 742. The lead 742 is connected to the AND 726 of stage 7 of the shifter and since a left shift operation is taking place the signal L RSHTREC passes through stage 7 of the shifter to generate the signals H SH7 and L SH7.

On a right shifting operation the bit read out of ALU7 is passed through AND 731 and over lead 744 to AND 746. The AND is further conditioned by the right shift signal L RSHA on lead 714 and the signal L B CLCK on lead 220. Thus, during a right shifting operation with a one bit in ALU7, AND 746 produces a true output for the duration of the B clock. The output of AND 746 drives the output of wired OR 738 true and the signal H SHCIOO is applied over lead 164 to the high order of the next lower order ADIU. At the same time, the next higher order ADIU may send the signal H SHCOIN over lead 163 and this signal will pass through driver 736 and AND 748 to become the signal L LSH REC on lead 750. The lead 750 is connected to the AND 722 of stage 0 of the shifter and since this is a right shifting operation the signal L LSH REC passes through AND 722 and OR 728 to generate true output signals from stage 0 of the shifter.

DECIMAL ADDITION AND SUBTRACTION CORRECTION

Figure 8:
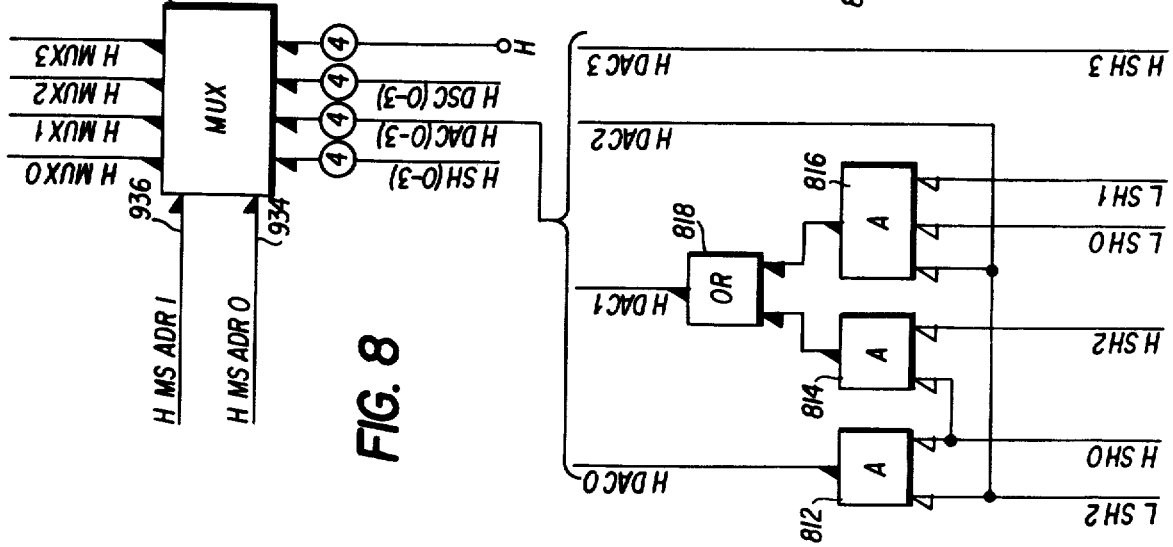
FIG. 8 shows the logic of a typical decimal subtraction correction circuit and a typical decimal addition correction circuit, as well as the output multiplexer for the arithmetic and logic unit.

FIG. 8 illustrates the details of decimal subtraction correction circuit 115 and decimal addition correction circuit 116. The decimal subtraction correction circuit 115 comprises three ANDs 802, 804, and 806 feeding an OR 808, and an Exclusive OR 810. The decimal subtraction correction circuit receives the output signals SH4–SH7 from the four low order stages of the shifter 113 and developes from these signals the corrected decimal indication which is applied as the signals DSC4–DSC7 to one set of inputs of the MUX 122. It will be understood that there is a second decimal subtraction correction circuit 114 like the decimal subtraction correction circuit shown in FIG. 8, the second decimal subtraction correction circuit receiving the output signals SH0–SH3 from the shifter and generating a corrected indication which is applied to MUX 124 as the signals DSC0–DSC3.

With respect to the decimal subtraction correction circuit shown, the signal H SH7 passes through the correction circuit unchanged. The signal L SH6 passes through the correction circuit unchanged and is also applied to one input of AND 806. AND 806 further receives the signals L SH4 and L SH5. The signal H SH4 is applied to one input of each of ANDs 802 and 804. AND 802 further receives the signal H SH5 which is also applied to one input of the Exclusive OR 810. The signal H SH6 is applied to the second input of AND 804 and a second input of Exclusive OR 810.

FIG. 8 also shows the details of the decimal addition correction circuit 116 which includes three ANDs 812, 814 and 816 and an OR 818. The decimal addition correction circuit receives the signals SH0–SH3 from the shifter 113 and produces a corrected indication which is applied to one set of inputs of MUX 124 as the signals DAC0–DAC3. It will be understood that there is another decimal addition correction circuit like that shown which receives the signals SH4–SH7 from the shifter and applies a corrected indication to MUX 122 as the signals DAC4–DAC7.

As illustrated in FIG. 8, the signal H SH3 passes through the decimal addition correction circuit unchanged. The signal L SH2 passes through the correction circuit unchanged and is also applied to one input of AND 812. The signal H SH0 is applied to a second input of AND 812 and one input of AND 814. AND 812 generates the high order correction signal H DAC 0. The signal H SH2 is applied to a second input of AND 814. AND 816 has three inputs for receiving L SH0, L SH1 and L SH2. The outputs of ANDs 814 and 816 are applied to OR 818 to generate the next to the high order correction signal H DAC 1.

Figure 9:
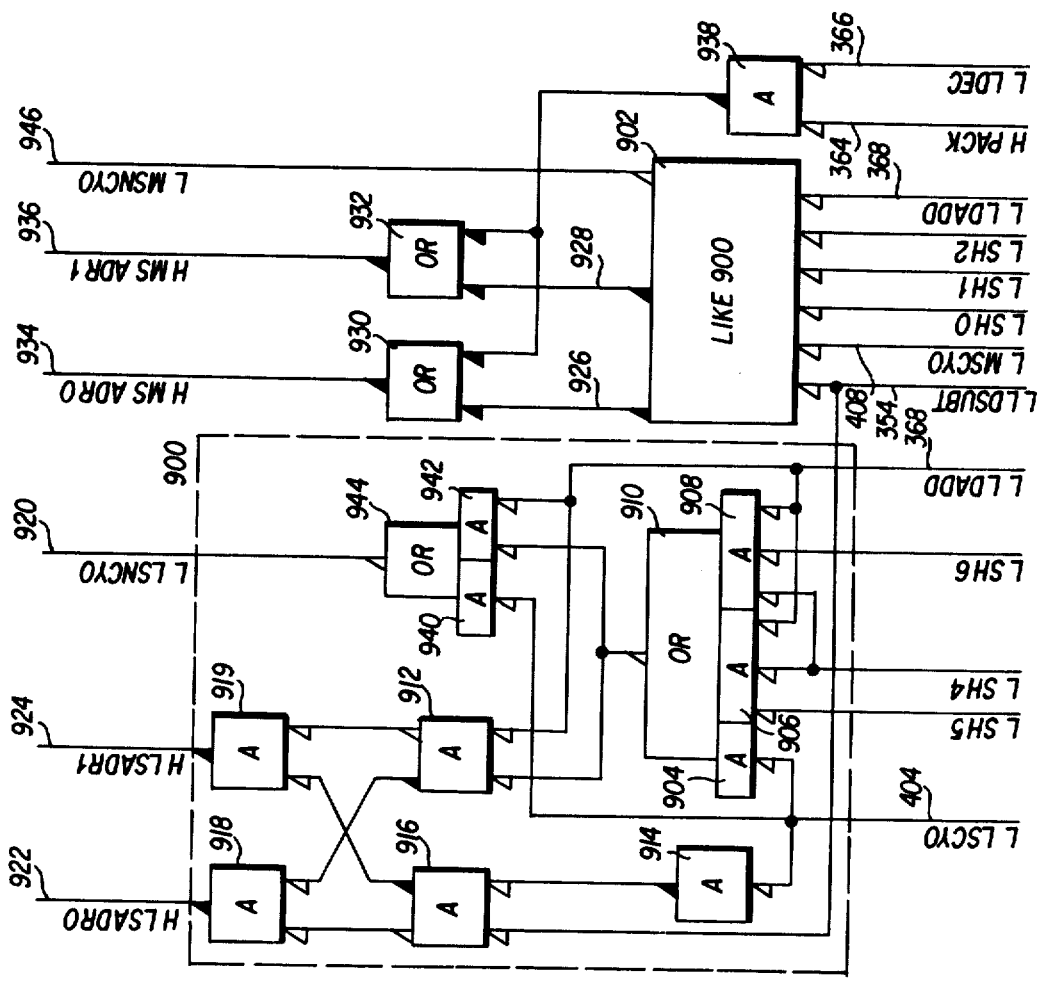
FIG. 9 shows the logic circuits for generating the multiplexer addresses and the carry out signals for decimal arithmetic operations.

As shown in FIG. 8, the MUXs 122 and 124 each receive two addressing signals and the combination of addressing signals determines which sets of inputs to the MUXs are gated through to the outputs. The MUX address generator is shown in FIG. 9 and includes two identical circuits 900 and 902 for generating the multiplexer address bits for multiplexers 122 and 124, respectively.

The circuit 900 includes three ANDs 904, 906 and 908 feeding an OR 910 having its output connected to one input of an AND 912. The signal L LDADD is applied to one input of ANDs 906, 908 and 912. The signal L SH4 is applied to one input of ANDs 906 and 908. The signal L SH5 is applied to a further input of AND 906 while the signal L SH6 is applied to a further input of AND 908.

The signal L LSCYO from Adder 400 is applied to ANDs 904 and 914 with the output of AND 914 being connected to AND 916. AND 916 is further enabled by the signal L LDSUBT and produces complementary output signals which are applied to NANDs 918 and 919. Complementary outputs from AND 912 are applied to second inputs of NANDs 918 and 919. The output signals from ANDs 918 and 919 are the addressing signals H LSADR0 and H LSADR1 which address the least significant multiplexer 122.

The circuit 902 is like the circuit 900 but receives the output signals L SH0–L SH2 from the three high order stages of the shifter 113 and the carry signal L MSCYO from the Adder 402. The output leads 926 and 928 correspond to the outputs 922 and 924 of circuit 900. Leads 926 and 928 are connected to inputs of two ORs 930 and 932 which produce the output signals H MSADR0 and H MSADR1 for addressing the most significant multiplexer 124. In addition, ORs 930 and 932 are connected to the output of an AND 938 which receives the signals H PACK and L LDEC from the Function Class Decoder 162.

The circuit 900 includes the Decimal Carry Out Detection Circuit 119 (FIG. 1) while the circuit 902 includes the Decimal Carry Out Detection Circuit 118. The least significant decimal carry out detection circuit includes two ANDs 940 and 942 feeding an OR 944. The signal L LSCYO on lead 404 is applied through AND 940 and OR 944 to generate the carry signal L LSNCYO on lead 920.

AND 942 receives the output of OR 910 and is further enabled by the signal L LDADD on lead 368. Thus, AND 942 produces a carry output signal for the least significant nibble on a decimal add operation if either stages 4 and 5 or 4 and 6 of the shifter contain binary ones.

In like manner, Circuit 902 generates the signal L MSNCYO on lead 946 during a decimal add operation if stages 0 and 1 or 0 and 2 of the shifter contain binary ones.

R REGISTER AND THROUGH CHECK

Figure 10:
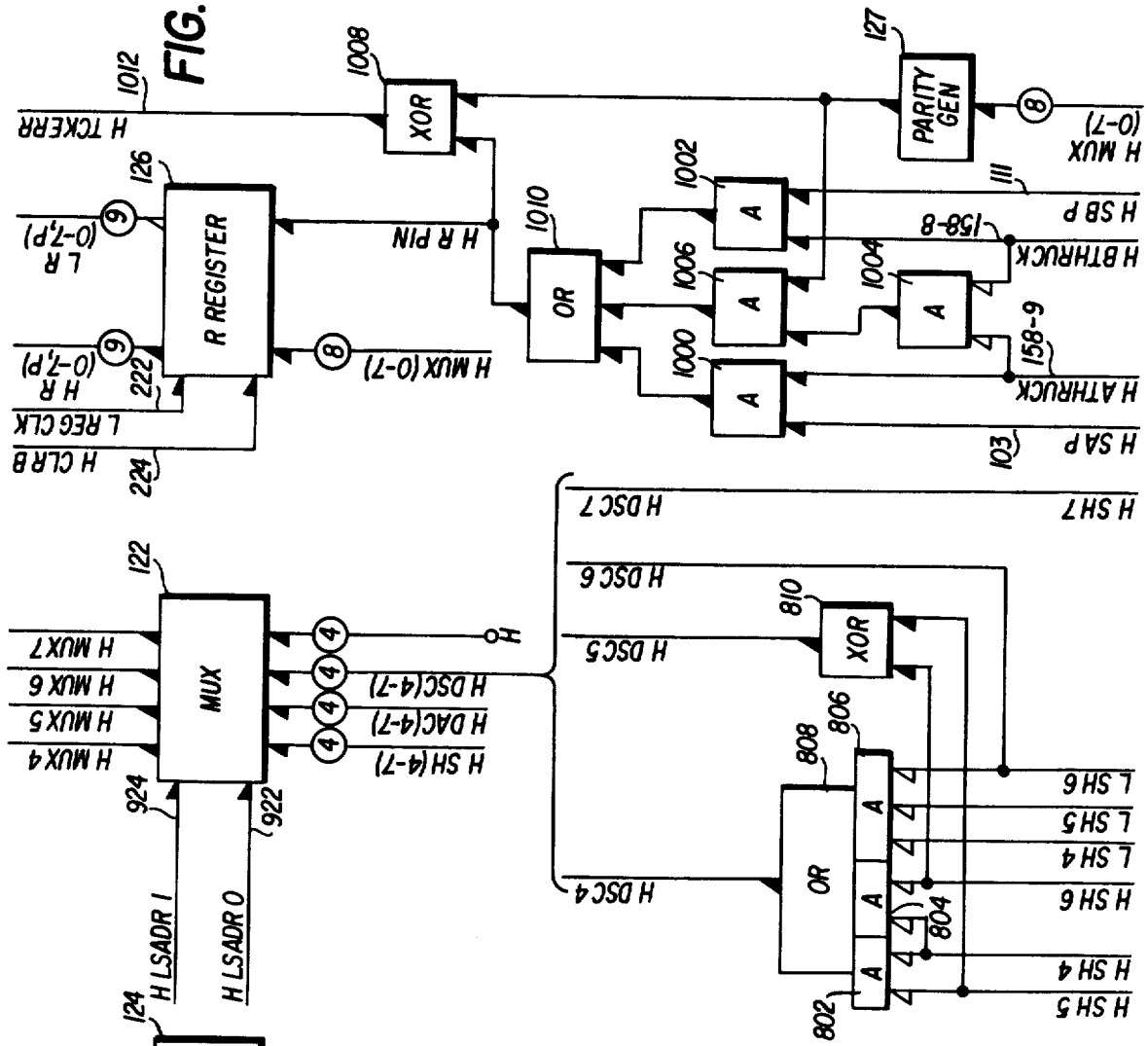
FIG. 10 shows the through check circuits and the R Register.

As shown in FIG. 1A, the output of the ALU, as derived from MUXs 122 and 124 is applied to a Parity Generator 127 and the Register 126. The R Register and Parity Generator are shown again in FIG. 10 together with the Through Check Circuit. The purpose of the Through Check Circuit is to check the parity as generated by parity generator 127 with the parity bit from the SA Bus 103 or the SB Bus 111 on those operations where the parity of the data should not change as the data is passed through the ALU.

The signal H SA P on Bus 103 is applied to one input of AND 1000 which also receives the signal H A THRUCK over lead 158-9 from the Control Decode ROM 158. The parity bit from SB Bus 111 is applied to one input of AND 1002 which also receives the signal H B THRUCK from the Control Decode ROM 158. The signals H A THRUCK and H B THRUCK are applied to NAND 1004 having an output connected to one input of an AND 1006. The output of Parity Generator 127 is connected to AND 1006 and to an Exclusive OR 1008. The outputs of ANDs 1000, 1002 and 1006 are applied to an OR 1010 and the output of AND 1010 is connected to an input of Exclusive OR 1008 and to the parity bit stage of the R Register 126.

When both signals H A THRUCK and H B THRUCK are false, the output of AND 1004 enables AND 1006 so that the parity of the output of multiplexers 122 and 124, as generated by Parity Generator 127, is passed through AND 1006 and OR 1010 to be clocked into the R Register 126 along with the outputs H MUX(0–7) from the multiplexers. The R Register is cleared when the signal H CLR B is ture, and the clocking of the data and parity bits into the R Register occurs at the trailing edge of the B clock when the signal L REG CLK goes false. The Exclusive OR 1008 does not produce the through check error signal on lead 1012 because the outputs of parity generator 127 and OR 1010 are either both true or both false.

Assume as a further example that an instruction is being executed to enter a value from the A Bus without change into the R Register. This instruction causes the generation of the signal H A THRUCK to enable AND 1000. The parity bit H SA P on Bus 103 is applied to the second input of AND 1000 thus producing an output that passes through OR 1010 to set the parity stage of the R Register. In addition, the parity bit derived from OR 1010 is applied to one input of Exclusive OR 1008 where it is compared with the parity of the data passing through MUXs 122 and 124, this latter parity being generated by parity generator 127.

AND 1002 serves the same function as AND 1000 except that it is active only when data is to be passed from the B Bus into the R Register without change.

If at any time the parity as indicated by the output of OR 1010 does not agree with the parity as indicated by the output of Parity Generator 127, Exclusive OR 1008 produces the through check error signal H TCKERR on lead 1012.

ERROR CORRECTION CODE CIRCUITS

A key feature of the ADIU is that it generates error correcting code (ECC) parity bits on a byte-wide basis so that ECC check bits for a multibyte word can be generated externally with a minimum of hardware. The external circuits may be like those described in the aforementioned concurrently filed application to which reference may be made for an overview of a multibyte system having ECC capabilities.

A byte correction code (BCC) comprising eight bits plus parity is generated from the contents of the R Register in each ADIU. In accordance with Table II.

TABLE II

| BYTE CORRECTION CODE BIT | | | | BYTE 0 R REGISTER BITS | | | | | | | | | | | | | | |
|---|---|---|---|---|---|---|---|---|---|---|---|---|---|---|---|---|---|---|
| P | = | | | P | | | | | | | | | | | | | | |
| 0 | = | | | 1 | ∀ | 3 | ∀ | 5 | ∀ | 7 | | | | | | | | |
| 1 | = | | | 2 | ∀ | 3 | ∀ | 6 | ∀ | 7 | | | | | | | | |
| 2 | = | | | 4 | ∀ | 5 | ∀ | 6 | ∀ | 7 | | | | | | | | |
| 3 | = | | | 1 | ∀ | 2 | ∀ | 4 | ∀ | 7 | | | | | | | | |
| 4 | = | 0 | ∀ | 1 | ∀ | 2 | ∀ | 3 | ∀ | 4 | ∀ | 5 | ∀ | 6 | ∀ | 7 | | |
| 5 | = | 0 | ∀ | 1 | ∀ | 2 | ∀ | 3 | ∀ | 4 | ∀ | 5 | ∀ | 6 | ∀ | 7 | | |
| 6 | = | 0 | ∀ | 1 | ∀ | 2 | ∀ | 3 | ∀ | 4 | ∀ | 5 | ∀ | 6 | ∀ | 7 | | |
| 7 | = | 0 | | | | | | | | | | | | | | | | |

V = Exclusive OR

Table II shows the BCC for byte 0 in a multibyte system. As explained in the aforementioned copending application the encoding in each ADIU may be identical with the changes in the BCC for each byte other than byte 0 being obtained by switching the output connecting leads extending from the ADIU's to the external circuits.

Figures 11, 12:
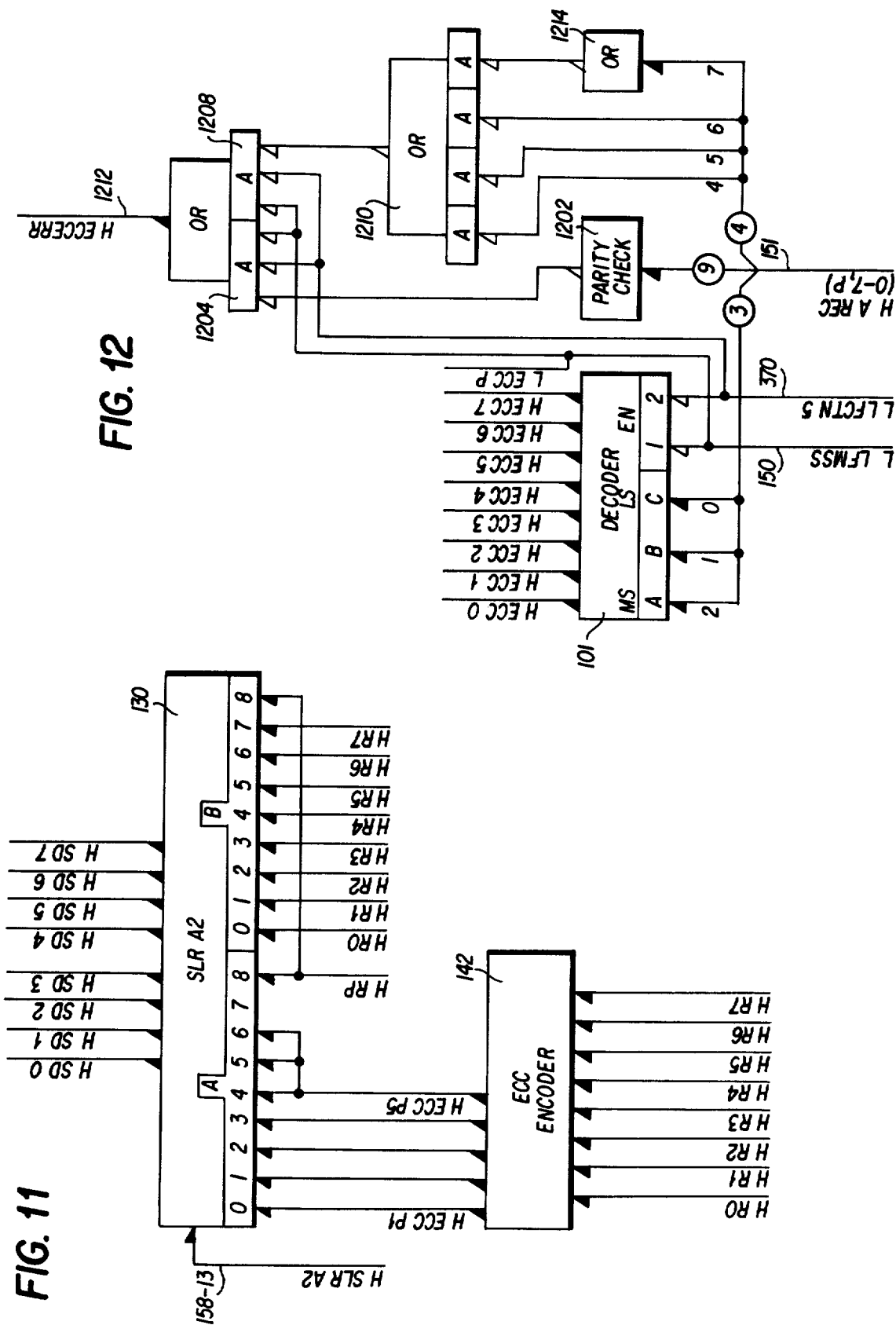
FIG. 11 shows the error correction code parity bit encoder and the A Bus output selector.
FIG. 12 shows the circuits for decoding an error syndrome and generating an ECC error signal.

The BCC for byte 0 is generated by the circuits shown in FIG. 11. The outputs from stages R0-R7 of the R Register are applied to the ECC Encoder 142 to generate the byte 0 parity bits ECCP1-ECCP5 in accordance with Table II. The signals ECCP1-ECCP5 are applied to the A0-A4 inputs of selector 130 so that if the selector is enabled the signals pass through the selector to become the signals SD0-SD4 representing BCC bits 0-4. The A inputs of Selector 130 are enabled when the signal H SLRA2, derived from the control decode ROM 158, is true.

Inspection of Table II shows that BCC bits 4, 5 and 6 should be identical. Therefore, the signal ECCP5 is also applied to inputs A5 and A6 of Selector 130 to generate the signals SD5 and SD6. The input A7 to Selector 130 is tied to a negative voltage since, as shown in Table II, the BCC bit 7 should be zero. Thus the output H SD7 from the selector will be false. Furthermore, the BCC parity bit should, according to Table II, be the same as the parity bit in the R Register. Therefore, the signal H RP from the parity stage of the R Register is applied to the A8 input of Selector 130 to generate the signal SDP.

When the Selector 130 is enabled by the signal on lead 158-13 the BCC code appearing on the output leads of the selector is applied to the A Drivers 133 from whence it may be gated to the A Bus and the external circuits by an A Bus Enable signal on lead 135.

When the signal H SLRA2 is false, the B inputs of Selector 130 are enabled. These inputs receive the contents of the R Register hence, when the byte correction code is not needed as an output, the output of the R Register is gated through the selector to the A Bus Drivers 133 for driving the A Bus if the A Bus Drivers are enabled by the signal on lead 135.

FIG. 12 shows the circuits for generating the ECC error signal and decoding the error syndrome. The circuit of FIG. 12 receives the syndrome bits over bus 151 from the A Bus Receivers 100. A parity checker 1202 checks the error syndrome for correct parity and if a parity error exists it produces an output signal to enable an AND 1204. If the instruction being executed is ECC correction, the function class decoder circuits of FIG. 3 produce the signal L LFCTN 5 on lead 370 which is connected to an enabling input of decoder 101, a second input of AND 1204, and an input of an AND 1208. If the ADIU is one being corrected (as subsequently described) then the Latch 157 is set and the signal L LFMSS on lead 150 is true. The lead 150 is connected to a second enabling input of decoder 101, a third input of AND 1204 and an input of AND 1208.

FIG. 20 shows the format of the error syndrome applied to the A Bus of a selected ADIU. The three high order bits identify which bit of the byte requires correction. The three high order bits of the error syndrome are applied to Data Inputs A, B and C of decoder 101, which decodes the three inputs to produce one of the output signals H ECC0 through H ECC7. As best seen in FIG. 1, the output of decoder 101 is applied to one set of inputs of Selector 102.

The four low order bits of the error syndrome are applied to four inputs of an AND/OR Circuit 1210 with the low order bit being first inverted by passing it through an OR 1214.

Referring to FIG. 20, it is seen that the A Bus input for a selected ADIU during error correction has the constant value 110 in the four least significant bit positions. Thus, if the error syndrome applied to FIG. 12 is of the correct format all AND inputs to OR 1210 will be blocked and it will in turn block AND 1208 so that the signal H ECCERR is not generated. However, if the four least significant bits of the error syndrome are not correct then at least one of the AND inputs to OR 1210 is enabled and the signal H ECCERR is produced.

ERROR CHECK CIRCUITS

FIG. 13 shows the details of the decimal digit check circuit 169 which checks the bits on the SA Bus 103 to make sure that they represent valid decimal digits. The bit SA4 is applied to an AND 1300 while the bits SA5 and SA6 are applied to an AND 1302. If the least significant nibble on the SA Bus represents a value greater than 9 then the signal SA4 blocks AND 1300 while one of the signals SA5 and SA6 blocks AND 1302. As a result, OR 1304 produces an output signal to enable AND 1306. Both ANDs 1306 and 1308 receive the signal L DEC from the Function Class Decoder 162 during execution of decimal instructions. The output of AND 1306 passes through OR 1310 to become the signal H DIGERRA indicating that the decimal digit on the SA Bus is not a valid decimal digit.

When operating in the decimal packed mode there are two decimal digits on the SA Bus. ANDs 1314 and 1316 sense bits SA0-SA2 and if the decimal digit in the upper nibble has a value greater than 9 the outputs from ANDs 1314 and 1316 drive the output of OR 1318 low to enable AND 1308. AND 1308 is further enabled by the signal L LPACK derived from the Function Class Decoder 162 during packed decimal operations. With all three inputs enabled AND 1308 drives OR 1310 to produce the signal H DIGERRA. This signal is applied to the Function Modification I/O Control Logic of FIG. 17.

As illustrated in FIG. 1, there is a decimal digit error check circuit 170 for the SB Bus 111. The B Bus checking circuit may be identical with that shown in FIG. 13 except that it responds to the bits SB0–SB2 and SB4–SB6. The outputs of the two decimal digit check circuits are ORed in FIG. 17.

FIG. 14 shows the circuit for checking the parity on the SA Bus 103. The eight bits and parity on the SA Bus are applied to a Parity Checker 1400 which generates a high level output signal if there is a parity error. The output of the Parity Checker 1400 is applied to AND 1402 and the parity error signal is blocked if the instruction or function being executed, as defined by the function bits F1–F4, is $0_H$, $9_H$ or $C_H$. The signals F1–F4 are derived directly from the Function Latches 161 of FIG. 1. The signals L F1, H F2, H F3 and L F4 are applied to an AND 1404 having an output connected through an OR 1406 to AND 1402. When the function being executed is $9_H$ AND 1404 produces an output signal that acts through OR 1406 to disable AND 1402 thereby blocking any error signal from Parity Checker 1400.

The signals H F3 and H F4 are applied to inputs of AND 1408. The signals H F1 and H F2 are applied to an Exclusive OR 1410 having its output connected to a third input of AND 1408. The output of AND 1408 is connected to OR 1406. Upon occurrence of either of the function codes $0_H$ or $C_H$ all inputs to AND 1408 are enabled and its output signal acts through OR 1406 to block AND 1402.

If a parity error is detected on the SA Bus by the Parity Checker 1400, and the function being performed is not function $0_H$, $9_H$, or $C_H$, AND 1402 produces the signal H APERR on lead 1412. This signal is applied to the error circuits of FIG. 16.

FIG. 15 shows the circuits for generating the SB Bus parity error signal BPERR. The eight bits plus parity on the SB Bus 111 are applied to a Parity Checker 1500 which generates an output signal to enable one input of an AND 1502 if the parity is incorrect. AND 1502 is blocked so that the signal H BPERR cannot be generated if the instruction or function being performed is $0_H$, $1_H$, $8_H$, $A_H$ or $E_H$.

The signals F1–F4 are derived from the Function Latches 161. An AND 1504 receives the signals L F1, L F3 and H F4 while an AND 1506 receives the signals L F1, H F2 and H F4, and a further AND 1508 receives the signals H F1, H F2 and H F3. The outputs of ANDs 1504, 1506 and 1508 drive an OR 1510 having its output connected to AND 1502. During execution of instructions or functions $A_H$ and $E_H$ AND 1504 produces an output through OR 1510 to block AND 1502. During execution of functions $A_H$ and $8_H$ AND 1506 acts through OR 1510 to block AND 1502. During execution of functions $0_H$ and $1_H$ AND 1508 acts through OR 1510 to block AND 1502. On execution of an instruction other than $0_H$, $1_H$, $8_H$, $A_H$ and $E_H$ AND 1502 produces the signal H BPERR on lead 1512 if the Parity Checker 1500 detects a parity error on the SB Bus 111. The signal H BPERR is applied to the error circuits of FIG. 16.

FIG. 16 shows the Error Flip-Flop 1600 which is set any time the ADIU is to produce the error signal output designated H ERROO. Flip-Flop 1600 is cleared by H CLR A or the leading edge of H BCLK. The signal H CLRA is applied to one input of OR 1602 and passes through the OR to the clear input of Flip-Flop 1600. The signal H BLCK is applied to one input of an AND 1604 and through OR 1606, AND 1608, OR 1610 and OR 1612 to a second input of AND 1604. When the B clock is low the output of OR 1612 enables one input of AND 1604. At the leading edge of H BCLK AND 1604 is enabled and its output signal passes through OR 1602 to clear Flip-Flop 1600. As soon as the leading edge of H BLCK has had time to pass through OR 1606, AND 1608 and ORs 1610 and 1612, it blocks AND 1604.

The flip-flop is set by the output of an AND 1614 which is enabled by a signal on lead 380 as long as the function being performed is not NO OPERATION. The signals H APERR, H BPERR, H ECCERR and H TCKERR are applied to an OR 1616 having its output connected to AND 1614. Thus, upon occurrence of a parity error on either the SA or SB Bus, an ECC error, or a through check error, the output of AND 1614 enables the data input to Flip-Flop 1600 provided the function being performed is not NO OPERATION. The flip-flop is set at the trailing edge of the B clock when the signal on lead 220 rises.

FUNCTION MODIFICATION CONTROL

FIG. 17 shows the overflow detection circuits and the input/output controls for the Function Modifier and Special Status Bit FMSS.

The overflow detection circuits include three Exclusive ORs 1700, 1702 and 1703. Exclusive OR 1700 receives the high order bits from the SA and SB Buses 103 and 111 while Exclusive OR 1702 receives the output of the high order stage and the carry from the most significant nibble adder 402. The outputs of Exclusive ORs 1700 and 1702 are connected to inputs of Exclusive OR 1703 and the output of Exclusive OR 1703 is the signal L OVFL which is applied to one input of an AND 1704. AND 1704 is further enabled by the signals H DEC and L ARITH which are obtained from the Function Class Decoder of FIG. 3.

The signals H DIGERRA and H DIGERRB are applied to an OR 1706 having its output connected to one input of an AND 1708. AND 1708 is further enabled by the signal H DEC hence if an invalid decimal digit is sensed on the SA or SB Bus during a decimal operation AND 1708 produces an output to drive the output of OR 1710 true. The output of OR 1710 is driven true by the output of AND 1704 upon an occurrence of an overflow during an arithmetic operation that is not a decimal operation.

The output from OR 1710 is applied to the data input of latch 1712. The latch is made porous when the signal L BCLKC goes true and is latched on the clock trailing edge. The latch is cleared by H CLRA on lead 216.

When Flip-Flop 1712 is set it enables one input of an AND 1714. AND 1714 is further enabled when the B clock is inactive by the false state of the signal on lead 230. AND 1714 produces an output which drives OR 1716 so that the special status signal H FMSSOO on the control line 154 is true.

As previously stated, the active state of the B clock defines the FMSS control line as an input. When the signal H FMSS IN on control line 154 is true it drives the output of OR 1716 to the high level. The output of OR 1716 enables one input of AND 1718. During the active state of the B clock the signal H BCLK CD on lead 230 is true thus enabling AND 1718 to produce the signal H FMSSA on lead 156.

ZERO DETECTION AND CARRY OUT

Figure 18:
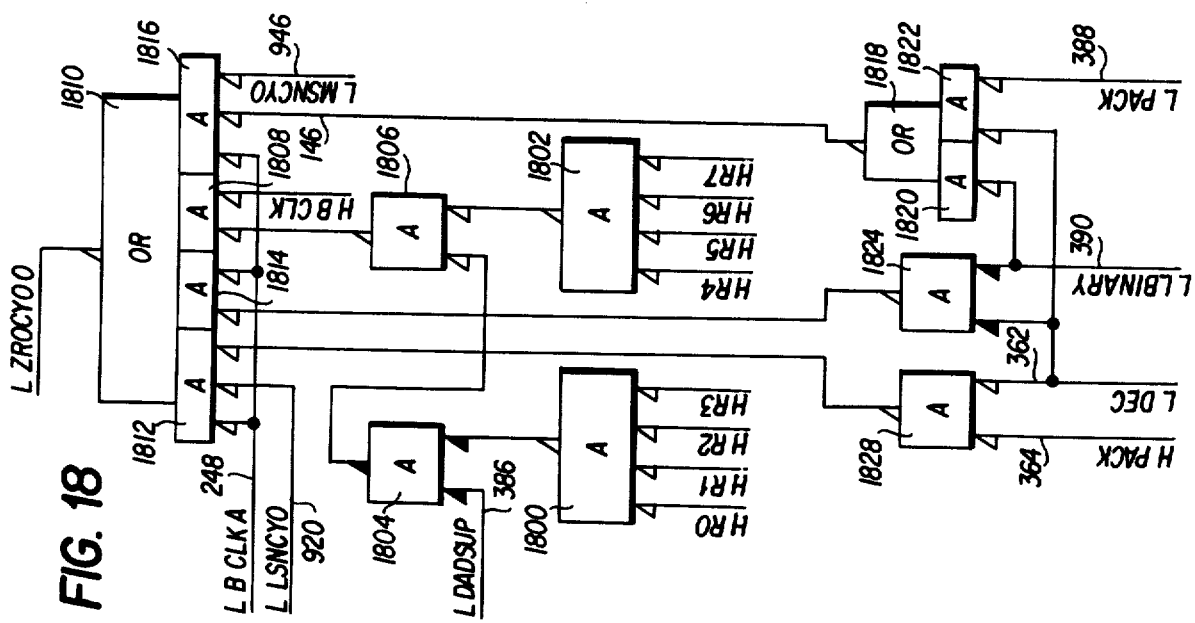
FIG. 18 shows the R Register zero detection and carry out circuits.

The zero detection and carry out circuits are illustrated in FIG. 18. An AND 1800 receives the outputs from the four high order stages of the R Register 126 while an AND 1802 receives the outputs from the four low order stages. The output of AND 1800 is applied to an AND 1804 which also receives the signal L DADSUP. This latter signal is true during the execution of decimal additions and subtractions in the unpacked mode. The output of AND 1804 is applied to AND 1806 together with the output of AND 1802. If the four high order stages of the R Register contain zero bits AND 1800 produces an output signal to disable AND 1804 thus enabling one input of AND 1806. If the four low order bits of the R Register are also zeroes then AND 1802 enables the second input of AND 1806 so that it produces an output signal to an AND 1808. AND 1808 also receives the signal H BCLK on lead 146. Thus, if the contents of the R Register are zero AND 1808 produces an output signal through OR 1810 when the active state of the B clock terminates. The output of OR 1810 is the signal L ZROCYOO which is applied to circuits external of the ADIU over lead 175.

On unpacked decimal addition and subtraction operations the signal L DADSUP is true and blocks AND 1804 so that one input of AND 1806 is enabled regardless of the contents of the four high order stages of the R Register. In this case, if the unpacked decimal digit in the four low order stages of the R Register is a zero the AND 1806 is enabled and, through AND 1808 and OR 1810 produces L ZROCYOO.

During the active state of the B clock a carry output may be generated from OR 1810 on lead 175 by one of three ANDs 1812, 1814 or 1816. All three of these ANDs are enabled by the signal L B CLKA on lead 248. An AND 1828 receives the signals H PACK and L DEC from the function class decode circuits and, if a decimal operation in the unpacked mode is being executed the output of AND 1828 enables AND 1812. AND 1812 further receives the signal L LSNCYO from the least significant nibble carry out detection circuit of FIG. 9.

AND 1816 receives the signal L MSNCYO from the most significant nibble carry out detection circuit of FIG. 9 and produces a carry signal through OR 1810 if it is further enabled by the output of an OR 1818. OR 1818 receives its inputs from two ANDs 1820 and 1822. AND 1820 is enabled during binary operations by the signal L LBINARY on lead 390. AND 1822 is enabled during packed decimal operations by the signals L DEC and L PACK.

An AND 1824 receives the signals L DEC and L LBINARY and if both of these signals are false the AND produces an output signal to enable AND 1814. Thus, during the active state of the B clock AND 1814 drives OR 1810 to produce the signal L ZROCYOO on lead 175 if neither a decimal nor a binary operation is specified by the Function Class Decoder 162.

INSTRUCTION REPERTOIRE

The instructions which may be executed by the ADIU are summarized in the following paragraphs. Each paragraph is headed by the instruction name, the hexadecimal value of the function bits F1–F4 defining the instruction, and the state of the control line 154 (HFMSS) during the active state of the clock. An (X) indicates that the state of HFMSS is immaterial.

($\phi_H$) NO OPERATION (NO OP) HFMSS (X)

As the name implies, no new operations are initiated when this instruction is decoded. The Function Latches 161 enable AND 318 to produce the command H NO OP. In FIG. 16, this command sets flip-flop 214 thus preventing the signal L R REG CLK from going false and resetting the R Register. Thus the contents of the R Register are not changed during this instruction and they are available to all buses through activation of the appropriate bus enable controls on leads 134, 135 and-/or 136. No special status is generated for this instruction. The leading edge of H CLK clears the Error Flip-Flop 1600 for this instruction as it does for all other instructions. At the trailing edge of the clock, the time when error signals are sampled by the error flip-flop, these signals are blocked at AND 1614 by the signal H NO OP on lead 380. The net result is that any existing errors are cleared at the beginning of a NO OP instruction and no new errors are allowed to appear during the instruction.

($1_H$) ECC ENCODE HFMSS (X)

An argument on the C Bus is passed through Selector 107, Latch 108, Selector 102 (when the instruction is decoded and the clock is active), ALU 105, Shifter 113 and MUXs 122 and 124 and is loaded into the R Register on the trailing edge of the clock. The contents of the R Register are applied directly to the Encoder 142 so that the byte correction code is available with logic level delay at Selector 130. The signal H SLR A2 enables Selector 130 so that the byte correction code is available at A Drivers 133 and thus may be gated through the drivers to the A Bus provided the ADIU is receiving an A Bus enable signal on lead 135.

($2_H$) UNPACKED DECIMAL SUBTRACT HFMSS (Low)

The binary coded decimal digits represented by the least significant nibble of the A Bus and the B Bus serve as the input arguments. The operation performed is decimal subtraction where the A Bus is the minuend and the B Bus is the subtrahend. The least significant nibble is checked for validity as a binary coded decimal digit by the Digit Check Circuits 169 and 170. A binary input greater than nine causes the Flip-Flop 1712 to be set thereby activating the invalid digit special status (HFMSS) output. Carry out of the ADIU when it is executing decimal unpacked operations is generated by the least significant nibble. The ADIU logic assumes that the least significant ADIU receives an initial carry in. A decimal digit check is not performed on the most significant nibble and the most significant nibble or digit output is forced to 1111.

(2H) PACKED DECIMAL SUBTRACT HFMSS (High)

Decimal subtraction is performed on A Bus and B Bus arguments which, for this instruction, each represent two binary coded decimal digits packed together in a single byte. For this instruction the A Bus is the minuend and the B Bus is the subtrahend. Decimal carries from the least significant digit to the most significant digit are handled within the ADIU and are transparent to circuits outside of the ADIU. Carry out from the ADIU is the carry out from the most significant digit.

Both digits on both the A Bus and B Bus inputs are checked by decimal digit checkers 169 and 170 to determine that they are valid binary coded decimal digits. An invalid binary coded decimal input causes the generation of the invalid digit special status. The ADIU logic assumes that the least significant ADIU receives an initial carry in.

($3_H$) UNPACKED DECIMAL ADD HFMSS (Low)

Decimal addition is performed on A Bus and B Bus arguments which, for this instruction, represent a single binary coded decimal digit each. The A Bus is the augend and the B Bus is the addend. The least significant nibble at each input is checked for validity as a binary coded decimal digit and if a binary combination greater than nine appears in the nibble on either input bus the invalid digit special status is activated. The most significant nibble is not checked at the input and binary 15 (1111) is forced at the most significant digit output. The ADIU logic assumes that the least significant ADIU receives an initial carry in.

($3_H$) PACKED DECIMAL ADD HFMSS (High)

Decimal addition is performed on A Bus and B Bus arguments which, for this instruction, represent two binary coded decimal digits packed into the input byte on each input bus. The A Bus is the augend and the B Bus is the addend. Decimal carries from the least significant to the most significant nibble or digit are handled internally. Carry out from the ADIU is the carry out from the most significant digit. The upper and lower nibbles of both input arguments are checked for validity by the Decimal Check Circuits 169 and 170. If an improper binary coded decimal digit is sensed in any one of the four nibbles appearing at the input, the invalid digit special status is activated.

($4_H$) BINARY SUBTRACTION, B minus A HFMSS (X)

When this instruction is decoded, the argument on the A Bus is subtracted from the argument on the B Bus. The ADIU logic assumes that input arguments are expressed in 2's complement form and that the least significant ADIU receives an initial carry in. Each ADIU assumes its most significant bit is a sign bit. If the carry out of the most significant bit does not agree with the carry in to that bit, Flip-Flop 1712 is set to indicate overflow by activation of the HFMSS control line 154. It should be noted that external logic must select the overflow from the ADIU which actually contains the sign bit.

($5_H$) DUMMY ECC CORRECTION HFMSS (Low)

This is the operation executed at all unselected ADIU's when a single correctable error is detected. The content of the R Register is Exclusive ORed with a zero byte and stored again in the R Register by the clock trailing edge. The net result is that the R Register is unchanged. This is the desired result in that no error was detected in the byte contained in the given unselected ADIU. The content of the R Register (correct data) is then available to all buses. This instruction provides the capability of a system to issue an ECC single bit correction instruction to several ADIU chips without changing the data content where that is the desired result. If four ADIU circuits are being used to form a multi-byte word, and a single correctable error is detected, the instruction code ($5_H$) would be issued to all of the chips with the HFMSS control line being low for three of them to designate them as unselected. The HFMSS control line to the fourth ADIU would be high to cause that ADIU to be selected so that an actual single bit correction would occur in the fourth chip at the same time that the dummy correction instruction is executed in the three unselected chips.

($5_H$) ECC CORRECTION HFMSS (High)

When a single bit correctable error is detected by examination of an error syndrome by external logic, as explained in the aforementioned copending application, this instruction is issued to the ADIU containing the single bit error. The high level of the HFMSS control line causes the ADIU containing the error to be selected. When selected, that ADIU executes the real ECC correction instruction instead of the dummy ECC instruction previously explained. The error syndrome is distributed to the A Bus of all ADIUs over the same network of interconnections which were used to generate the check bits and the syndrome. The format of the error syndrome is shown in FIG. 20. The distributed syndrome data must be stable at the ADIU input at least by the time the instruction bits are stable because the ADIU uses the A Bus input to determine which bit is to be corrected. The selected ADIU extracts and decodes the 3-bit correction bit address from the distributed syndrome at its A Bus input and generates a byte containing a logical "1" in the bit position defined by the three address bits. FIG. 21 indicates the A Bus input pattern and the corresponding output from ECC Decoder 101 for the eight possible error conditions. When the byte developed by the ECC Decoder 101 is exclusive ORed with data in the R Register, the error bit is inverted or corrected.

($6_H$) BINARY SUBTRACTION, A minus B HFMSS (X)

When this instruction is decoded the argument on the B Bus is subtracted from the argument on the A Bus. The ADIU logic assumes that input arguments are expressed in 2's complements form and that the least significant ADIU receives an initial carry in. Each ADIU assumes that its most significant bit is the sign bit. If the carry out of the most significant bit does not agree with the carry in to that bit, an overflow is generated in FIG. 17 to set the Special Status Flip-Flop 1712 and provide a signal on lead 154 indicating special status during the inactive phase of the B clock. If the most significant bit of a given ADIU is not the sign bit, the signal on lead 154 is ignored.

($7_H$) BINARY ADDITION, A plus B HFMSS (High)

The argument on the B Bus is added to the argument on the A Bus according to the standard addition algorithm. Carry out is simply the carry out from the most significant bit of the ADIU and no initial carry in is expected. Overflow detection is exactly the same as for the binary subtraction, A minus B instruction described above.

($7_H$) BINARY ADDITION, C plus B HFMSS (Low)

The argument at the output of the C Bus Latch 107 is added to the argument on the B Bus according to the standard 2's complement binary addition algorithm. Carry out is the carry out from the most significant bit of the ADIU. No initial carry in is expected. Overflow detection is accomplished in exactly the same way as for the binary addition, A plus B instruction.

($8_H$) A BUS LEFT SHIFT HFMSS (Low)

The argument on the A Bus is shifted 1-position in the direction of the most significant bit and stored unaltered in the R Register at the trailing edge of the B clock. The most significant bit on the A Bus appears as the output signal H SHCOOO on the input/output lead 163 and the least significant bit of the R Register is set according to the signal H SHCII received on lead 164 from the next lower order ADIU. If a circular shift is desired, then the lead 164 of the least significant ADIU is connected to the lead 163 of the most significant ADIU. In any event, the shifted result is available to all buses after the trailing edge of the clock.

($8_H$) A BUS RIGHT SHIFT HFMSS (High)

The argument on the A Bus is shifted 1-bit position in the direction of the least significant bit and stored unaltered in the R Register at the trailing edge of the clock. The least significant bit on the A Bus appears as a signal H SHCIOO on Lead 164 and the most significant bit of the R Register is set to the level represented by the signal H SHCOIN on lead 163. If the ADIU in question is in the middle of a string of ADIU's, the Lead 163 is connected to the lead 164 of the next more significant ADIU. If the ADIU in question is the most significant chip, and circular shift is desired, the lead 163 is connected to the lead 164 of the least significant ADIU. The shifted result is available to all buses after the clock trailing edge. No special status is generated during execution of this command.

($9_H$) B BUS LEFT SHIFT HFMSS (Low)

This instruction is essentially the same as the instruction A Bus Left Shift. However, B Bus Lift Shift differs in that the R Register can be the source if the B Bus enable signal on lead 136 enables the B drivers to gate the contents of the R Register onto the B Bus from whence it will pass through the Receivers 109 and Selector 110 to the ALU. If external source data is to be shifted, the B Bus enable control must be inactive during the active state of the clock to block the output of the R Register. By loading a byte in the ADIU and repeatedly executing this instruction, the ADIU may be utilized as a parallel to serial shift register. Alternatively, repeated executions of this instruction provides a serial to parallel conversion capability if the data is serially applied to lead 164, one bit each time the instruction is executed.

($9_H$) B BUS RIGHT SHIFT HFMSS (High)

This instruction is basically the same as the A Bus right shift instruction except that the argument on the B Bus is shifted. Like the B Bus left shift instruction, the B Bus right shift instruction can utilize the contents of the R Register as the argument. No special status is generated during execution of this instruction.

($A_H$) BUS TRANSMIT (1010) HFMSS (Low)

The argument on the A Bus is stored unaltered in the R Register at the trailing edge of the clock and is then available to all buses including the A Bus. No special status is generated during the execution of this command. The parity bit on the A Bus, derived from SA Bus 103, is stored in the R Register in place of the parity normally generated by the Parity Generator 127 from the output of MUXs 122 and 124. The parity bit is inserted in the R Register by the circuits of FIG. 10 and, if the input parity and the generated parity bits do not agree, the circuits of FIG. 10 generate the through check error signal.

($A_H$) A BUS INVERTED TRANSMIT HFMSS (High)

This instruction is the same as the A Bus Transmit instrument described above except that the signal H TCA is applied to the ture/complement buffers 104 to invert the argument on the A Bus before it passes to the ALU.

($B_H$) A AND B HFMSS (Low)

The ALU 105 performs logical operation A AND B on the arguments on the A and B Buses. The result is stored in the R Register at the trailing edge of the clock and is then available to all buses. No special status is generated during the execution of this instruction.

($B_H$) (A OR B) NOT HFMSS (High)

The ALU 105 performs the logical operation (A OR B) NOT on the A and B arguments. The result is stored in the R Register by the clock trailing edge and is then available to all buses. No special status is generated during the execution of this instruction.

($C_H$) B BUS TRANSMIT HFMSS (Low)

This instruction is executed in the same manner as the A Bus Transmit instruction previously described. The only difference is that the argument employed is the argument on the B Bus.

($C_H$) B BUS INVERTED TRANSMIT HFMSS (High)

This instruction is essentially the same as the A Bus Inverted transmit instruction described above except that the argument on the B Bus is inverted and stored in the R Register by the trailing edge of the clock. The signal H TCB is applied to the True/Complement Buffers 112 to invert the argument from the B Bus before it is applied to the ALU.

($D_H$) A OR B HFMSS (Low)

This instruction takes the arguments from the A and B Buses, performs the logical operation (A OR B) on them in the ALU 105, and stores the result in the R Register at the trailing edge of the clock. The result is then available to all buses. There is no special status generated during the execution of this instruction.

($D_H$) (A AND B) NOT HFMSS (High)

This instruction takes the arguments from the A and B Buses, performs the logical operation (A AND B) NOT on them in the ALU 105, and stores the result in the R Register on the trailing edge of the clock so that it is then available to all buses. No special status is generated during execution of this instruction.

($E_H$) C BUS TRANSMIT HFMSS (Low)

This instruction is similar to the instructions A Bus Transmit and B Bus Transmit previously described except that the argument at the output of the C Bus Latch is stored unaltered in the R Register at the trailing edge of the clock.

($E_H$) C BUS INVERTED TRANSMIT HFMSS (High)

This intruction is similar to the B Bus inverted Transmit instruction previously described and differs only in that the argument at the output of the C Bus Latch is inverted and stored in the R Register at the trailing edge of the clock.

($F_H$) A XOR B HFMSS (X)

This instruction takes arguments from the A and B Buses and performs the logical Exclusive OR function on them in the ALU 105. The result is stored in the R Register at the trailing edge of the clock and is then available to all buses. No special status is generated during the execution of this instruction.

TIMING CONSIDERATIONS

The timing diagram of FIG. 19 illustrates one microcycle of operation. The B clock signal is active during the first half of a microcycle and inactive during the last half of the microcycle. The function bits defining an instruction to be performed are applied to Latches 161 and the latch outputs become active shortly after the B clock becomes active. The signal HFMSS on control lead 154 designates an input when the clock is active and an output when the clock is inactive. Shortly after the Latches 157 and 161 are set, the Control Decoder ROM 158 and Function Class Decoder 162 are activated so that the internal control signals stabilize. Input data on the A, B or C Buses may be applied either before or after the internal control signals stabilize, but the input data must be applied in sufficient time for the ADIU to perform the required operation before the B clock shifts to the inactive state.

The signal R=Zero/CYO on lead 175 indicates a valid carry out during the latter portion of the period when the clock is active. When the clock goes inactive, the signal on lead 175 provides an indication of whether or not the content of the R Register is zero.

If an error occurs then the Error Flip-Flop 1600 is set to provide an indication of the error on lead 172 shortly after the B clock goes inactive. At the same time, the result of the operation performed by the controlling instruction is entered into the R Register and is available to any of the bidirectional buses provided external signals sample the contents of the R Register by enabling the bus drivers 134,135 and/or 136. Thus, the ADIU executes any instruction and makes the result available in a time corresponding to the duration of the active state of one clock pulse.

MULTI-BYTE ERROR CORRECTION

FIG. 12 of the above mentioned copending application illustrates how four external circuits called Multifunction Nets (MFN) may be utilized to generate an error correction code in a system where a word is 8 bytes wide. In such a system nine ADIU's are required, one for each byte of data and one for the ECC byte. As an example of operation, assume that a word is to be entered in memory. The word is sent to the ADIUs and each of them is sent the instruction ECC Encode ($1_H$). Each ADIU generates a BCC which is the same for all bytes. The output wiring from the ADIUs to the MFNs is switched and the MFNs operated to generate an ECC byte in accordance with the pattern illustrated in FIG. 11 of the copending application. The generated ECC byte is then passed to an ADIU from whence it may be stored in memory together with the word with which it is associated.

Upon read out of a word from memory it is entered into the ADIUs along with the ECC byte. The word in the ADIUs is applied to the MFNs to generate a new ECC byte which is Exclusive ORed or compared with the ECC byte read from memory. If an error exists the MFNs generate an error syndrome having the general format shown in FIG. 20 of the present application and more specifically a byte having one of the values shown as an A Bus input in FIG. 21. The error syndrome is derived from the A Latches of the copending application and defines which bit in a byte requires correction. The MFNs of the copending application produce a signal on one of the leads F9, F10, F11 or F12 to indicate which byte contains the incorrect bit.

The signals F9–F12 are applied as the H FMSS IN signals on lead 154 of each ADIU. The error syndrome, as previously described, is applied to the A Bus inputs of all ADIU's. Concurrently, instruction $5_H$ is applied to all the ADIU's so that one of them executes the ECC correction instruction while the remainder execute the dummy ECC correction instruction. For the ADIU's executing the dummy ECC correction instruction, the word in the R Register is read out through selector 110 to the ALU 105 where it is Exclusive-ORed with a zero byte in the ALU 105 and thus returned to the R Register on the clock trailing edge unchanged.

For the ADIU containing the error, the byte containing the error is read out through selector 110 to the ALU 105. The error syndrome applied to the A Bus of the ADIU from the MFN is decoded by the ECC Decoder 101 to produce a correction byte as indicated in the right portion of FIG. 21. The output of the decoder is passed through Selector 102 to ALU 105 where it is Exclusive Ored with the byte containing the error thus resulting in the inversion or correction of the bit which was in error. The corrected byte is then passed into the R Register on the trailing edge of the clock so that it is available for gating onto one of the buses.

While a particular preferred embodiment of the invention has been described in detail, it will be understood that various substitutions, modifications and additions may be made in the embodiment shown without departing from the spirit and scope of the invention as defined by the appended claims.

The embodiments of the invention in which an exclusive property or privilege are claimed are defined as follows:

1. An integrated circuit chip adapted for connection to external means including an instruction bus on which instructions appear, a source producing a clock pulse, a function modifier control line on which function modifier signals appear, and at least one data bus, said integrated circuit chip including thereon:
   instruction decoder means for receiving an instruction from said instruction bus, a clock pulse from said source, and a signal on said function modifier control line, said instruction decoder means being responsive to the leading edge of said clock pulse for producing control signals during said signal pulse;
   a result register having an output;
   an arithmetic logic unit having an output connected to said result register for performing an Exclusive-Or function on signals applied thereto;
   means for connecting the output of said result register to a first input of said arithmetic logic unit;

error syndrome decoder means connected between said data bus and a second input of said arithmetic logic unit;

said instruction decoder means including first means responsive to a predetermined instruction on said instruction bus and the presence of a signal on said function modifier control line for controlling said error syndrome decoder means to decode an error syndrome on said data bus;

said instruction decoder means including second means responsive to said predetermined instruction on said instruction bus and the presence of a signal on said function modifier control line for controlling said arithmetic logic unit to take the Exclusive-Or of said decoded error syndrome and the output from said result register;

said result register being responsive to the trailing edge of said clock pulse for receiving the output of said arithmetic logic unit;

said instruction decoder means includes third means responsive to said predetermined instruction and the absence of a signal on said function modifier control line for inhibiting operation of said error syndrome decoder means whereby said error syndrome decoder means produces a zero value output; and said instruction decoder means including fourth means responsive to said predetermined instruction and the absence of a signal on said function modifier control line for controlling said arithmetic logic unit to perform the Exclusive-Or function on said zero value and the output of said result register.

2. The integrated circuit chip of claim 1 wherein: said at least one data bus comprises a first bidirectional data bus and said external means includes a second bidirectional data bus; and said integrated circuit chip includes means connecting said second bidirectional data bus to an input of said arithmetic logic unit.

3. The integrated circuit chip of claim 2 wherein said arithmetic logic unit receives first and second operands from said bidirectional data buses, respectively, said arithmetic logic unit including means responsive to control signals from said instruction decoder means for producing a result from said operands.

4. The integrated circuit chip of claim 3 including: gating means connected to said result register and said data buses for selectively gating said result to either or both of said data buses during the same clock pulse cycle said operands are received from said data buses.

5. An integrated circuit chip as claimed in claim 4 wherein said external means includes means for generating a function modifier signal, said integrated circuit chip further comprising a control line adapted for connection to receive said function modifier signal and for applying it to said instruction decoder means, said instruction decoder means including means producing first control signals for controlling said arithmetic logic means to perform a first set of arithmetic and logic operations on data received from said first and second bidirectional data buses in response to said function modifier signal and an instruction, and second control signals for controlling said arithmetic logic means to perform a second set of functions in response to said same instruction when said function modifier signal is not present.

6. An integrated circuit chip as claimed in claim 4 wherein said external means further includes a third bidirectional data bus, said integrated circuit chip further including selector means having inputs for receiving operands from said first or said third bidirectional data bus and an output connected to said arithmetic logic means.

7. An integrated circuit chip as claimed in claim 6 including:
a latch having an output connected to said selector means, said latch having an input for selectively receiving the output of said result register and means connecting the output of said result register to the input of said latch.

8. An integrated circuit chip as claimed in claim 6 including:
a selector having an output connected to said arithmetic logic means and inputs connected to said second bidirectional data bus and the output of said result register.

* * * * *

UNITED STATES PATENT OFFICE
CERTIFICATE OF CORRECTION

PATENT NO. : 4,360,891
DATED : Nov. 23, 1982
INVENTOR(S) : M.H. Branigin, L.D. Cubranich, E.E. Henderson It is certified that error appears in the above-identified patent and that said Letters Patent are hereby corrected as shown below:

IN THE CLAIMS:

Claim 1, line 61, change the last word in the line [signal] to --clock--.

Signed and Sealed this

Eighth Day of February 1983

[SEAL]

Attest:

Attesting Officer

GERALD J. MOSSINGHOFF
Commissioner of Patents and Trademarks